United States Patent
Peri et al.

(10) Patent No.: US 12,332,437 B2
(45) Date of Patent: Jun. 17, 2025

(54) SYSTEM AND METHOD FOR REDUCING IMAGE DATA THROUGHPUT TO HEAD MOUNTED DISPLAY

(71) Applicant: Samsung Electronics Co., Ltd., Suwon-si (KR)

(72) Inventors: Christopher A. Peri, Mountain View, CA (US); Yingen Xiong, Mountain View, CA (US); Lu Luo, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 364 days.

(21) Appl. No.: 16/990,779

(22) Filed: Aug. 11, 2020

(65) Prior Publication Data
US 2021/0311307 A1  Oct. 7, 2021

Related U.S. Application Data

(60) Provisional application No. 63/006,490, filed on Apr. 7, 2020.

(51) Int. Cl.
G02B 27/01 (2006.01)
G06F 3/01 (2006.01)
(Continued)

(52) U.S. Cl.
CPC ....... G02B 27/017 (2013.01); G02B 27/0101 (2013.01); G06F 3/012 (2013.01);
(Continued)

(58) Field of Classification Search
CPC .............. G02B 27/017; G02B 27/0101; G02B 2027/014; G02B 2027/0138;
(Continued)

(56) References Cited

U.S. PATENT DOCUMENTS 6,212,236 B1  4/2001  Nishida et al.
9,881,421 B2  1/2018  Bickerstaff et al.
(Continued)

FOREIGN PATENT DOCUMENTS

KR  10-1583598 B1  1/2016
KR  10-2020-0030844 A  3/2020

OTHER PUBLICATIONS

International Search Report of the International Searching Authority dated Feb. 15, 2021 in connection with International Application No. PCT/KR2020/015748, 4 pages.
(Continued)

*Primary Examiner* — David D Davis

(57) ABSTRACT

A method includes obtaining, from a memory of an electronic device connected to a head mounted display (HMD), a first reference frame, wherein the first reference frame comprises a first set of pixels associated with a first time. The method includes, rendering, at the electronic device, a source image as a new frame, wherein the new frame includes a second set of pixels associated with a display to be provided by the HMD at a second time, and generating, by the electronic device, a differential frame, wherein the differential frame is based on a difference operation between pixels of the new frame with pixels of the first reference frame to identify pixels unique to the new frame. Still further, the method includes sending the differential frame to the HMD, and storing the new frame in the memory of the electronic device as a second reference frame.

27 Claims, 14 Drawing Sheets

(51) Int. Cl.
*G06T 11/00* (2006.01)
*G06T 19/20* (2011.01)

(52) U.S. Cl.
CPC ............ *G06T 11/006* (2013.01); *G06T 19/20* (2013.01); *G02B 2027/014* (2013.01)

(58) Field of Classification Search
CPC . G02B 27/0093; G02B 27/0172; G06F 3/012; G06F 3/011; G06T 11/006; G06T 19/20; G06T 2200/24; G06T 11/60; H04N 13/239; H04N 13/161; H04N 13/194; H04N 13/332; H04N 13/366
See application file for complete search history.

(56) References Cited

U.S. PATENT DOCUMENTS

| | | | |
|---|---|---|---|
| 10,317,991 B2 | 6/2019 | Russell | |
| 2003/0063043 A1* | 4/2003 | Girard | G06F 3/14 345/8 |
| 2012/0121163 A1 | 5/2012 | Zhang et al. | |
| 2013/0002839 A1 | 1/2013 | Pennisi et al. | |
| 2013/0148740 A1 | 6/2013 | Samanta Singhar | |
| 2015/0379772 A1 | 12/2015 | Hoffman | |
| 2017/0045941 A1 | 2/2017 | Tokubo et al. | |
| 2017/0256240 A1 | 9/2017 | Lu et al. | |
| 2018/0047332 A1* | 2/2018 | Kuwahara | G09G 3/2096 |
| 2019/0058859 A1 | 2/2019 | Price et al. | |
| 2019/0147612 A1* | 5/2019 | Fleureau | G06F 3/0346 382/190 |
| 2019/0213975 A1 | 6/2019 | Nakata et al. | |
| 2020/0026349 A1* | 1/2020 | Fontanel | G06V 40/19 |
| 2020/0098186 A1* | 3/2020 | Xue | H04N 21/6587 |
| 2020/0122641 A1 | 4/2020 | Alsheghri | |

OTHER PUBLICATIONS

Written Opinion of the International Searching Authority dated Feb. 15, 2021 in connection with International Application No. PCT/KR2020/015748, 5 pages.
Request for the Submission of an Opinion dated Jan. 13, 2025 in connection with Korean Patent Application No. 10-2020-0139420, 18 pages.

* cited by examiner

FIRST VIEW – PHYSICAL OBJECTS ONLY
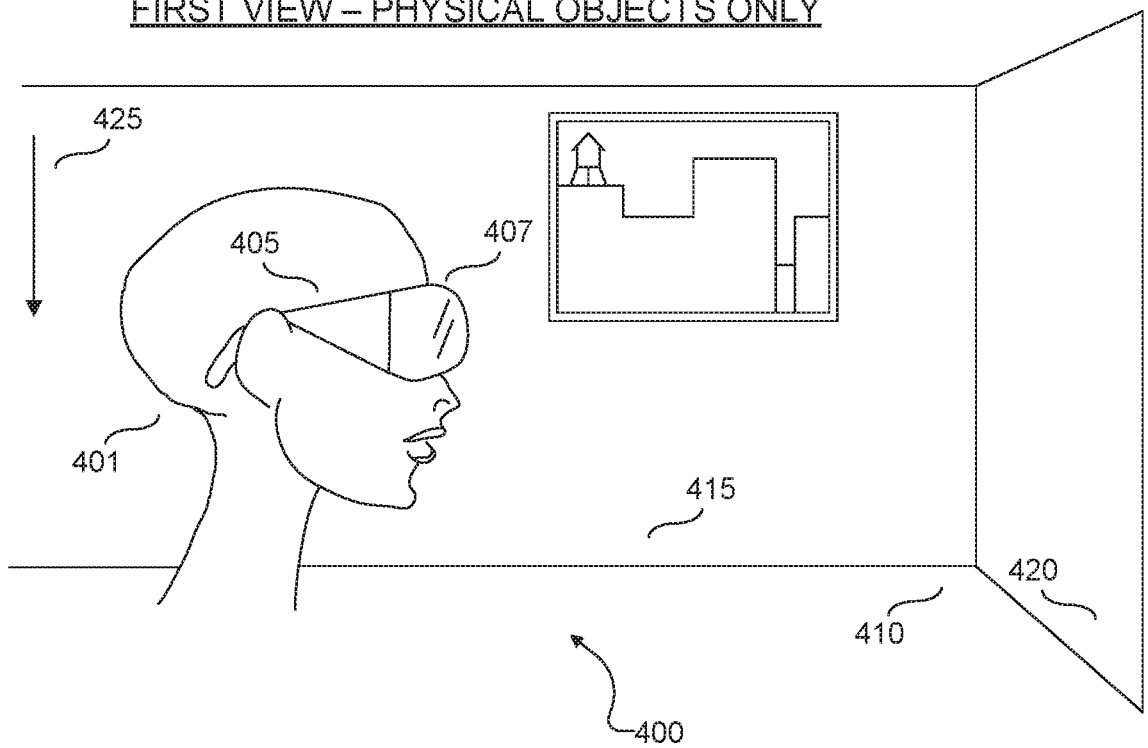
SECOND VIEW – PHYSICAL AND DIGITAL OBJECTS
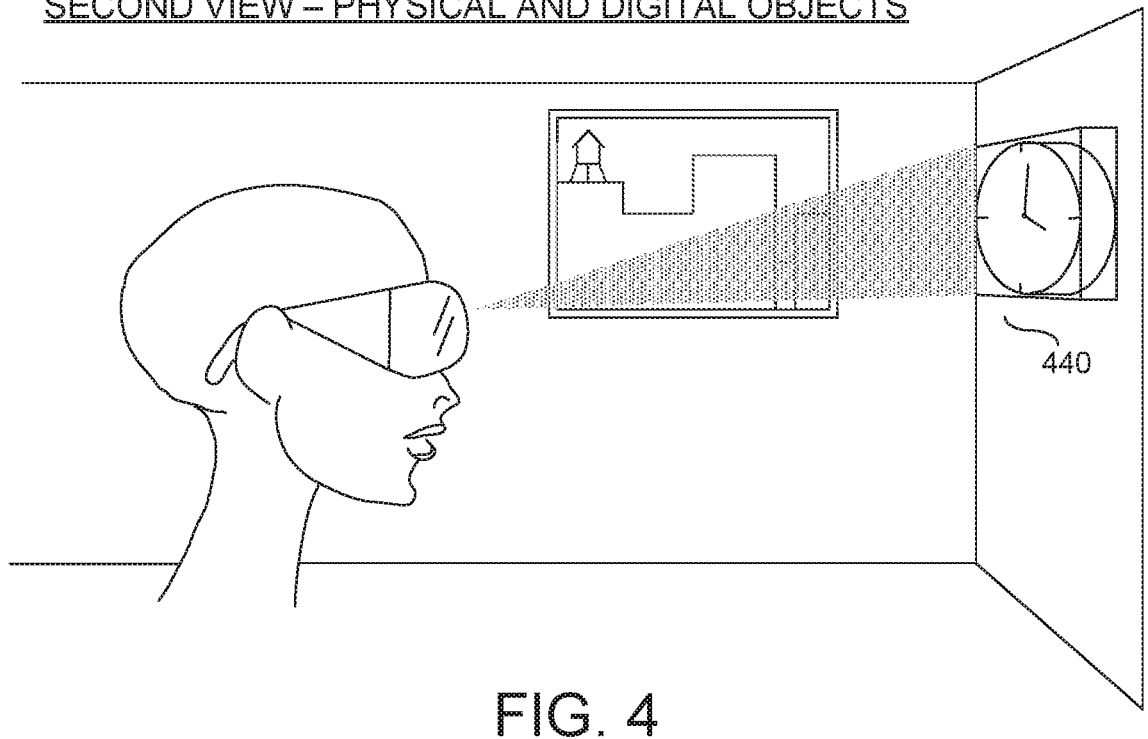
FIG. 4

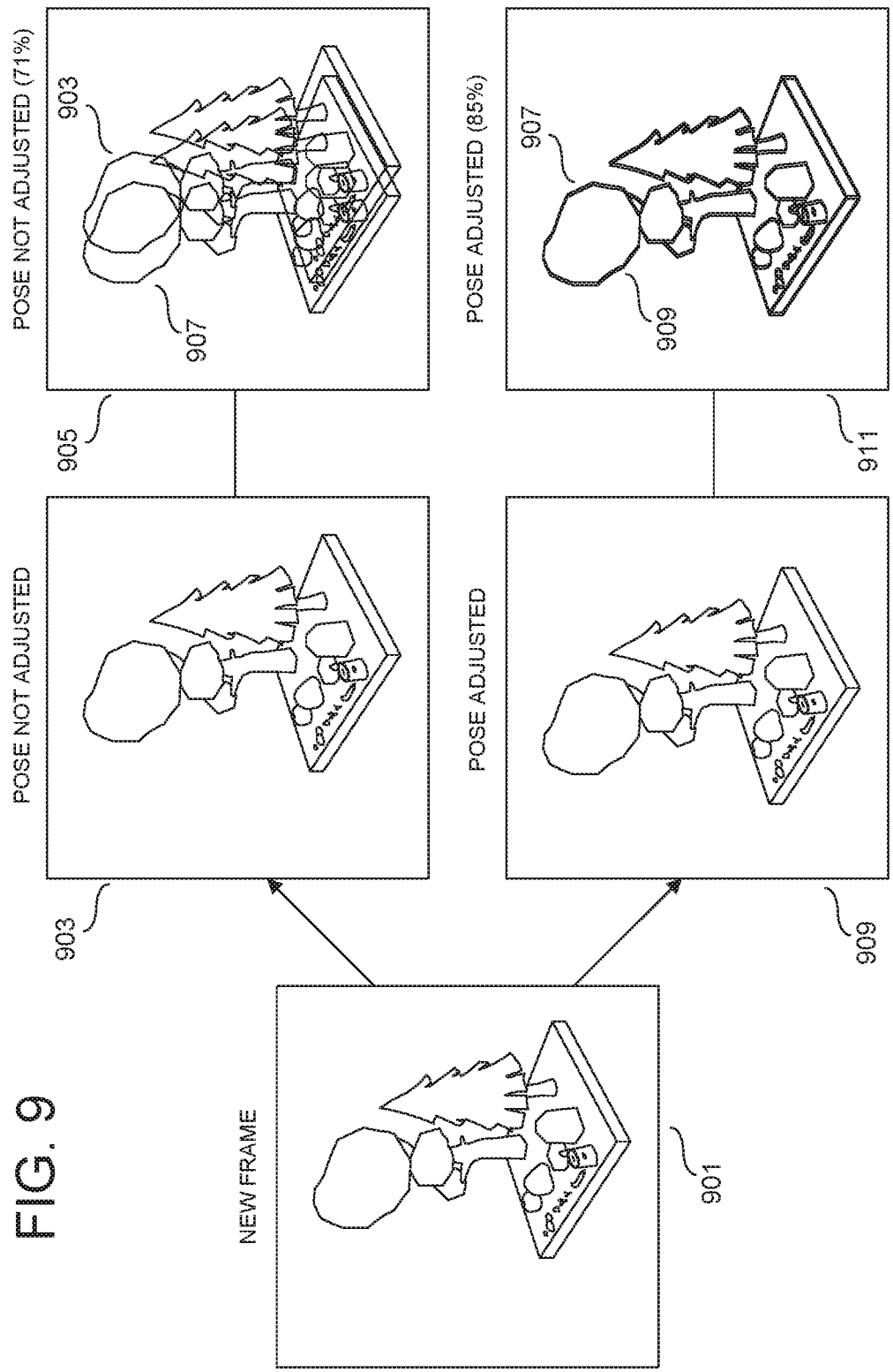

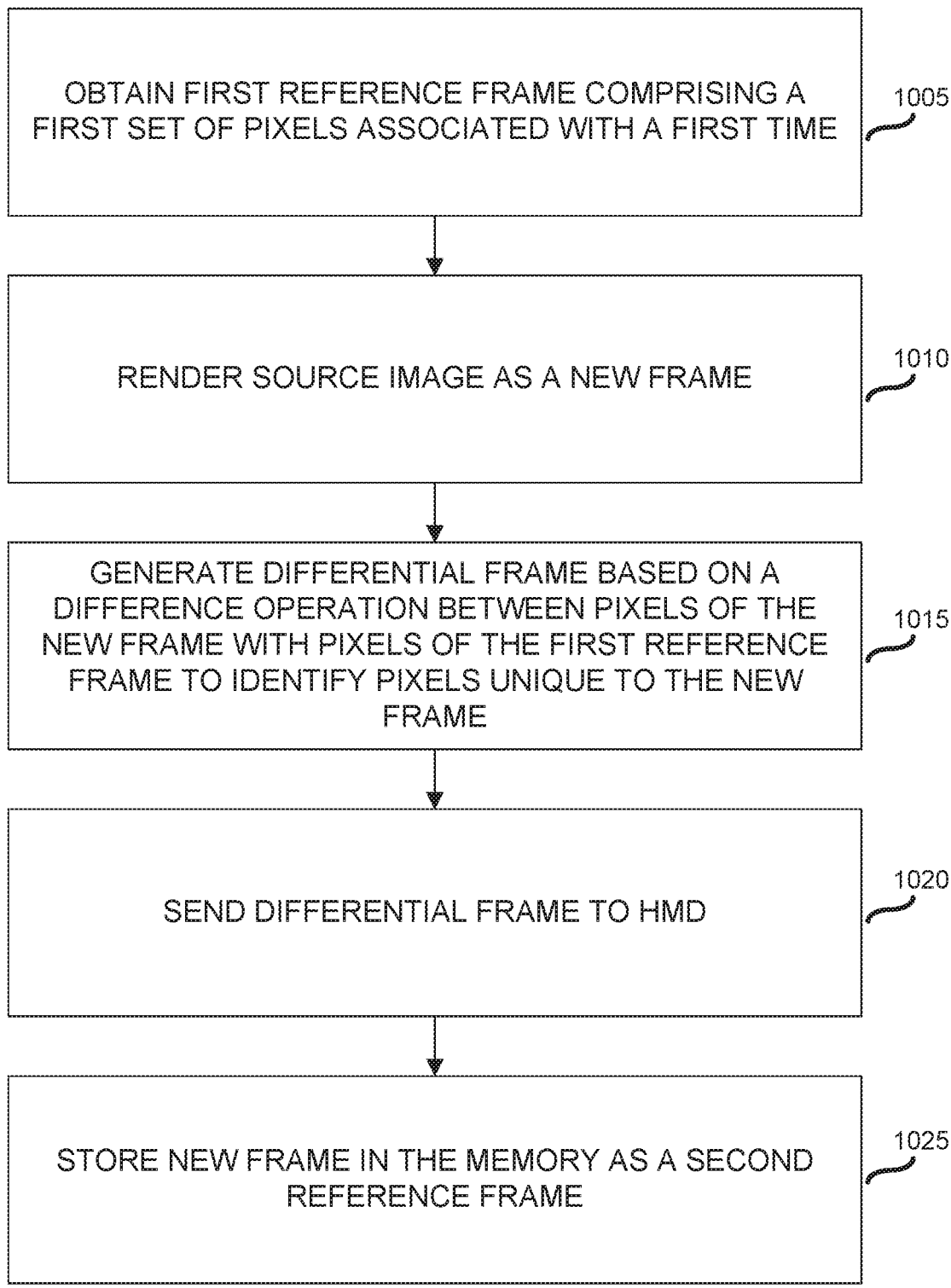

SYSTEM AND METHOD FOR REDUCING IMAGE DATA THROUGHPUT TO HEAD MOUNTED DISPLAY

CROSS-REFERENCE TO RELATED APPLICATION AND CLAIM OF PRIORITY

This application claims priority under 35 U.S.C. § 119(e) to U.S. Provisional Patent Application No. 63/006,490 filed on Apr. 7, 2020. The above-identified provisional patent application is hereby incorporated by reference in their entireties.

TECHNICAL FIELD

This disclosure relates generally to a system and method for reduced communication load through lossless data reduction.

BACKGROUND

In certain video rendering and display systems, including, without limitation, systems where an electronic device (for example, a smartphone or tablet) provides image content over a data link to be viewed as pose-adjusted content (for example, as digital objects in an extended reality (XR) display) at a head mounted display (HMD), the time associated with sending image content over the data link connecting the electronic device presents a performance bottleneck for the system. Reducing the time for transmitting image data to the TIMID without adversely affecting one or more dimensions of the performance of the system (for example, by consuming battery power more rapidly, or reducing the resolution of the display provided at the MID) remains a source of technical challenges and opportunities for improvement in the art.

SUMMARY

This disclosure provides systems and methods for reduced communication load through lossless data reduction.

In a first embodiment, a method of data reduction includes obtaining, from a memory of an electronic device connected to a head mounted display (HMD), a first reference frame, wherein the first reference frame comprises a first set of pixels associated with a first time and rendering, at the electronic device, a source image as a new frame, wherein the new frame includes a second set of pixels associated with a display to be provided by the TIMID at a second time subsequent to the first time. The method further includes generating, by the electronic device, a differential frame, wherein the differential frame is based on a difference operation between pixels of the new frame with pixels of the first reference frame to identify pixels unique to the new frame, sending the differential frame to the MID, and storing the new frame in the memory of the electronic device as a second reference frame.

In a second embodiment, a method of data reduction includes receiving, at a head mounted display (HMD), from an electronic device, a differential frame, wherein the differential frame includes a set of pixels unique to a new frame, and obtaining, from a memory of the HMD, a first reference frame. The method also includes obtaining, from a motion sensor of the HMD, head pose data, and generating the new frame at the HMD by combining the first reference frame with the differential frame. Still further, the method includes performing an image reprojection warp on the new frame based on the head pose data, and subsequent to performing the image reprojection warp, outputting the new frame to a display of the HMD.

In a third embodiment, an electronic device includes a processor and a memory containing instructions, which, when executed by the processor, cause the electronic device to obtain, from the memory of the electronic device, a first reference frame, wherein the first reference frame comprises a first set of pixels associated with a first time. When executed by the processor, the instructions further cause the electronic device to render, at the electronic device, a source image as a new frame, wherein the new frame includes a second set of pixels associated with a display to be provided by a head mounted display (TIMID) communicatively connected to the electronic device at a second time subsequent to the first time, generate a differential frame, wherein the differential frame is based on a difference operation between pixels of the new frame with pixels of the first reference frame to identify pixels unique to the new frame, send the differential frame to the MID, and store the new frame in the memory of the electronic device as a second reference frame.

In a fourth embodiment, a head mounted display (HMD) includes a motion sensor, a processor, and a memory. The memory contains instructions, which, when executed by the processor, cause the F/D to receive from an electronic device, a differential frame, wherein the differential frame includes a set of pixels unique to a new frame, obtain, from the memory, a first reference frame, obtain, from the motion sensor, head pose data, generate the new frame at the HMD by combining the first reference frame with the differential frame, perform an image reprojection warp on the new frame based on the head pose data, and subsequent to performing the image reprojection warp, output the new frame to a display of the HMD.

In a fifth embodiment, a non-transitory computer-readable medium contains instructions, which when executed by a processor, cause an electronic device to obtain, from a memory of the electronic device, a first reference frame, wherein the first reference frame includes a first set of pixels associated with a first time. When executed by the processor, the instructions further cause the electronic device to render, at the electronic device, a source image as a new frame, wherein the new frame includes a second set of pixels associated with a display to be provided by a head mounted display (TIMID) communicatively connected to the electronic device at a second time subsequent to the first time, generate a differential frame, wherein the differential frame is based on a difference operation between pixels of the new frame with pixels of the first reference frame to identify pixels unique to the new frame, send the differential frame to the HMD, and store the new frame in the memory of the electronic device as a second reference frame.

In a sixth embodiment, a non-transitory computer-readable medium contains instructions, which, when executed by a processor, cause a head mounted display (TIMID) to receive from an electronic device, a differential frame, wherein the differential frame includes a set of pixels unique to a new frame. When executed by the processor, the instructions further cause the TIMID to obtain, from the memory, a first reference frame, obtain, from a motion sensor of the HMD, head pose data, generate the new frame at the TIMID by combining the first reference frame with the differential frame, perform an image reprojection warp on the new frame based on the head pose data, and subsequent to performing the image reprojection warp, output the new frame to a display of the TIMID.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 4 illustrates aspects of an XR viewing experience provided at an HMD according to certain embodiments of this disclosure;

FIG. 9 illustrates aspects of the technical benefits realized by certain embodiments of this disclosure;

FIGS. 10A through 10D illustrate further operations performed at an electronic device according to certain embodiments of this disclosure.

DETAILED DESCRIPTION

FIGS. 1 through 11C, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processing platform.

Figure 1:
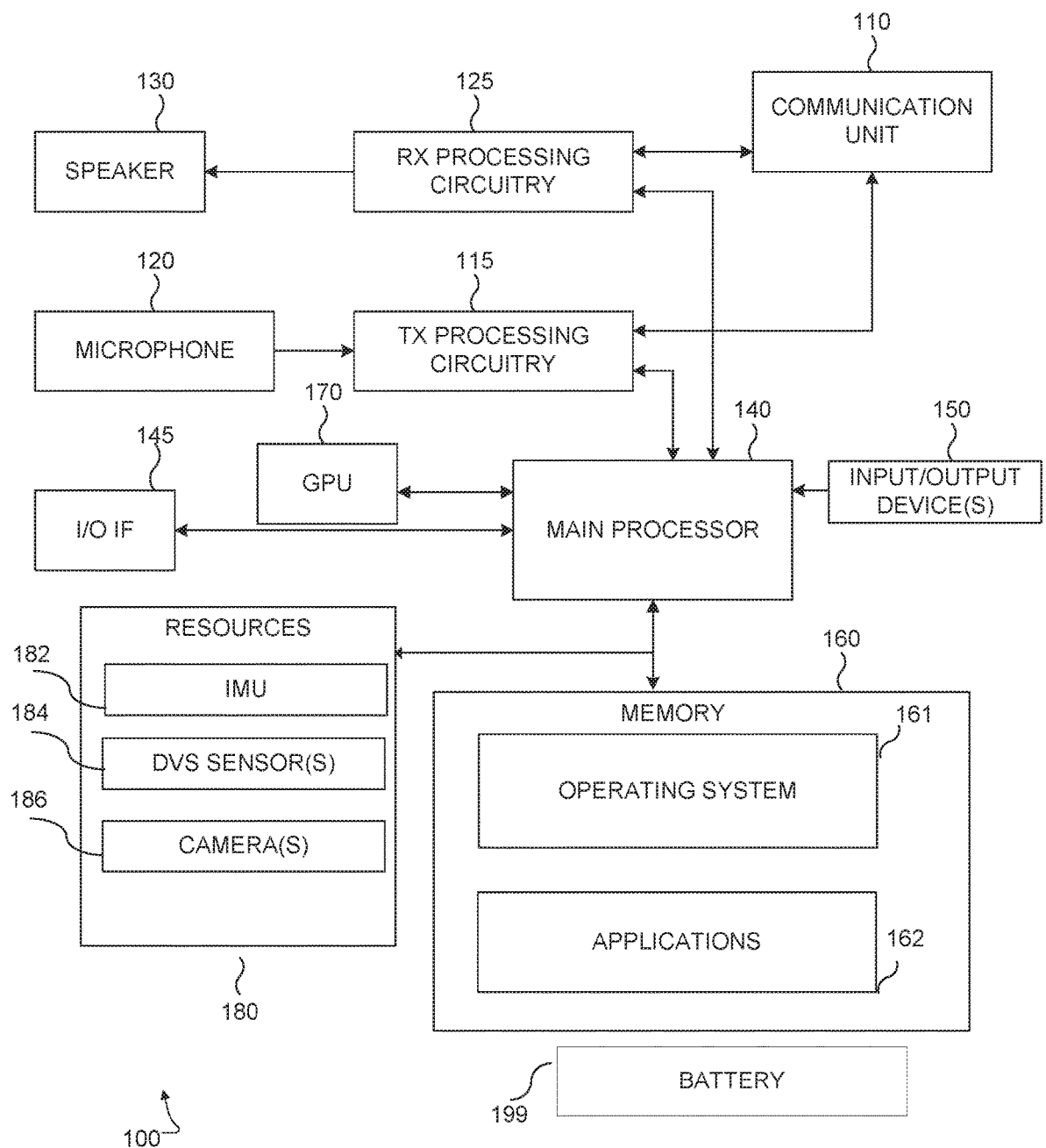
FIG. 1 illustrates a non-limiting example of an electronic device according to certain embodiments of this disclosure.

FIG. 1 illustrates a non-limiting example of a device 100 in an extended reality (XR) system according to some embodiments of this disclosure. According to various embodiments of this disclosure, the device 100 could be implemented as one or more of a smartphone, a tablet, or laptop computer for providing an extended reality (XR) experience. The embodiment of device 100 illustrated in FIG. 1 is for illustration only, and other configurations are possible. However, suitable devices come in a wide variety of configurations, and FIG. 1 does not limit the scope of this disclosure to any particular implementation of a device. For example, while certain embodiments according to this disclosure are described as being implemented on mobile XR platforms, embodiments according to this disclosure are not so limited, and embodiments implemented on virtual reality (VR) platforms are within the contemplated scope of this disclosure.

As shown in the non-limiting example of FIG. 1, the device 100 includes a communication unit 110 that may include, for example, a radio frequency (RF) transceiver, a BLUETOOTH transceiver, or a WI-FI transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, extended reality (XR) applications, augmented reality (AR) applications, operating systems, device security (e.g., anti-theft and device tracking) applications or any other applications that access resources of device 100, the resources of device 100 including, without limitation, speaker 130, microphone 120, input/output devices 150, and additional resources 180. According to some embodiments, applications 162 include applications that can consume or otherwise utilize semantic maps of physical objects in a field of view of visual sensors of device 100.

The communication unit 110 can receive an incoming RF signal, for example, a near field communication signal such as a BLUETOOTH or WI-FI signal. According to certain embodiments, the communication unit 110 is configured to create one or more links for sending and receiving data with a head mounted display (HMD). The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 can contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller. According to certain embodiments, main processor 140 is a low-power processor, such as a processor that includes control logic for minimizing consumption of battery 199, or minimizing heat buildup in the device 100.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. The main processor 140 is also coupled to the I/O interface 145, which provides the device 100 with the ability to connect to other devices such as laptop computers and handheld computers. The I/O interface 145 is the communication path between these accessories and the main processor 140. According to certain embodiments, the main processor 140 can execute one or more algorithms for encoding data (i.e., compressing) such that it requires fewer bits. Similarly, main processor 140 can execute one or more algorithms for decoding compressed data.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with device 100. In some embodiments, input/output device(s) 150 can include a touch panel, an augmented or virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170 that renders source data as pixels for display on one or more displays of device 100 or a HMD.

According to certain embodiments, device 100 includes a variety of additional resources 180 which can, if permitted, be accessed by applications 162. According to certain embodiments, additional resources 180 include an accelerometer or inertial measurement unit (IMU) 182 that can detect movements of the electronic device along one or more degrees of freedom. Additional resources 180 include, in some embodiments, one or more dynamic vision sensors 184, and one or more cameras 186 (for example, complementary metal oxide semiconductor (CMOS) sensor type cameras) of device 100. According to various embodiments, DVS sensor(s) 184 comprises a pair of dynamic vision sensors spaced at a stereoscopically appropriate distance for estimating depth at over a field of depth of interest. According to some embodiments DVS sensor(s) 184 comprises a plurality of DVS sensors with overlapping, or partially overlapping fields of view.

According to various embodiments, the above-described components of device 100 are powered by battery 199 (for example, a rechargeable lithium-ion battery), whose size, charge capacity and load capacity are, in some embodiments, constrained by the form factor and user demands of the device. As a non-limiting example, in embodiments where device 100 is a smartphone, the battery 199 is dimensioned to fit within the housing of the smartphone, and is configured not to support current loads (for example, by running a graphics processing unit at full power for sustained periods) causing heat buildup. As a further example, in embodiments where device 100 is a head mounted device, the size (and by implication, charge capacity) of battery 199 may be constrained by a need to keep device 100 as light as possible, to reduce neck strain on users and facilitate easy head movement.

Although FIG. 1 illustrates one example of a device 100 for reducing communication loads through lossless data reduction according to some embodiments of this disclosure, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operating environment in which various features disclosed in this patent document can be used, these features could be used in any other suitable system.

Figure 2:
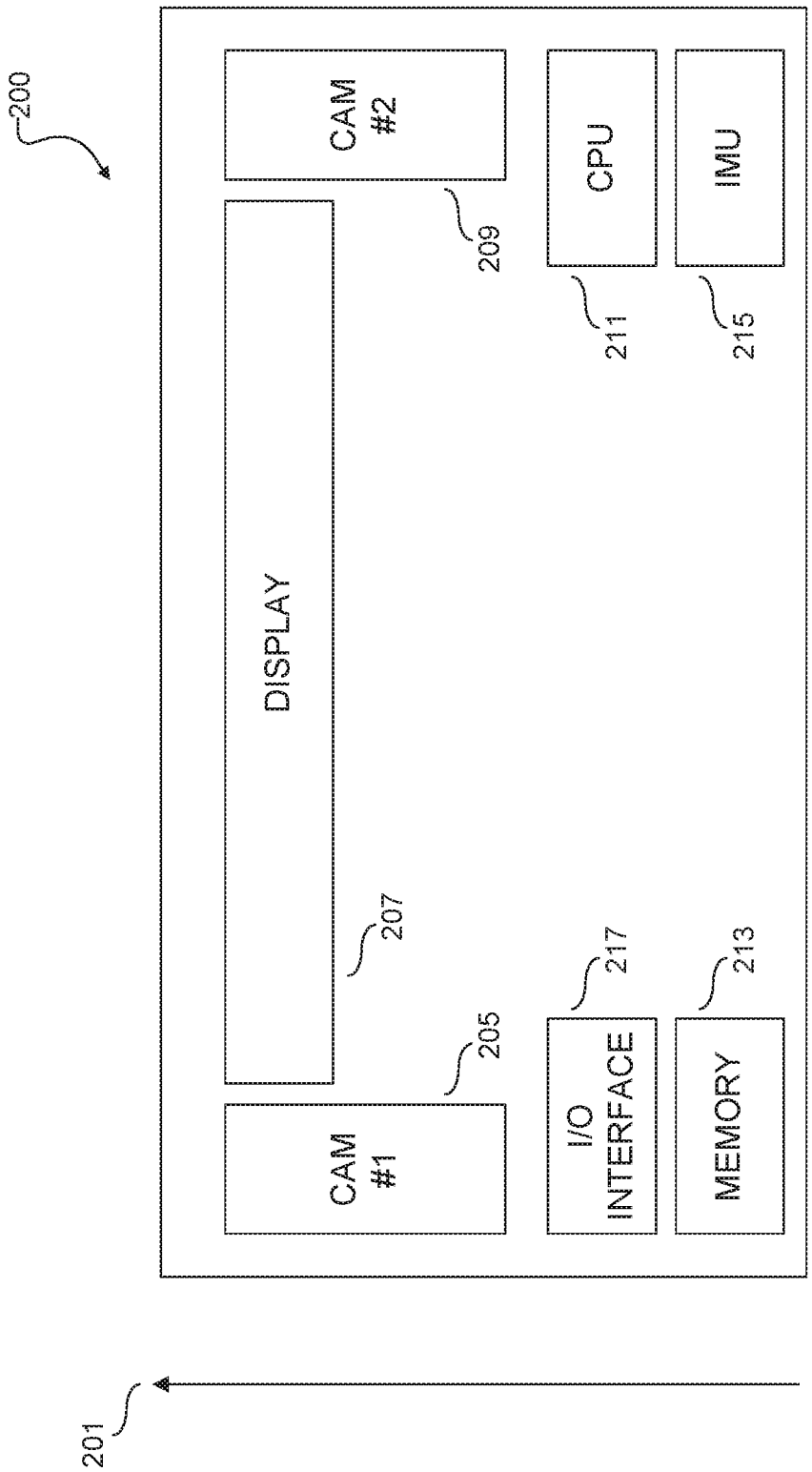
FIG. 2 illustrates an example of an apparatus that can function as a head mounted display (HMD) according to certain embodiments of this disclosure.

FIG. 2 illustrates an example of an apparatus 200 that can function as a head mounted display (HMD) according to one or more embodiments of this disclosure. The embodiment of the apparatus 200 shown in FIG. 2 is for illustration only and other embodiments could be used without departing from the scope of the present disclosure. According to some embodiments, apparatus 200 may operate as an accessory device to an electronic device (for example, a smartphone, a tablet or other computing platform capable of rendering pixels and transmitting same to apparatus 200).

Referring to the non-limiting example of FIG. 2, the apparatus 200 includes an externally oriented camera 205. For the purposes of explaining this non-limiting example, the arrow 201 is provided. Arrow 201 points externally, towards a field of view away from the direction of projection of an internal-facing display of apparatus 200. According to various embodiments, externally oriented camera 205 is an RGB digital video camera (for example, a camera using a CMOS sensor). According to some embodiments, externally oriented camera 205 is a camera capable of detecting light at wavelengths outside the visible range of the human eye (for example, infrared). In certain embodiments, externally oriented camera 205 is a dynamic vision sensor (DVS), which provides an event stream of changes in the intensity of light received at pixels of a sensor of the DVS. In this non-limiting example, externally-oriented camera 205 generates image data, either as an event stream or as discrete image frames, providing source data (for example, as head pose data, or to recognize objects within the physical world) for an XR display.

Referring to the non-limiting example of FIG. 2, the apparatus 200 includes display 207. According to various embodiments, display 207 displays, in an internally-facing direction (e.g., in a direction having a component that is opposite to arrow 301) items of XR content in conjunction with views of objects in an externally-facing field of view. According to some embodiments, display 207 is clear (similar to, for example, the displays used in "smart glasses" or "heads-up displays" on the cockpit glass of an airplane) and views of objects in externally-facing fields of view come from light passing through display 207. According to various embodiments, display 207 is opaque, and views of objects in externally-facing fields of view come from image data from externally-oriented cameras (for example, externally-oriented camera 205).

According to various embodiments, apparatus 200 includes a second camera 209. In some embodiments, the second camera 209 is an externally-oriented camera of the same type as externally-oriented camera 205, thereby forming a stereoscopic pair that can generate image data comprising depth estimation. In certain embodiments, the second camera 209 is an externally-oriented camera with a different sensor type than externally-oriented camera 205. For example, in some embodiments, to extend battery life and minimize processor usage, externally-oriented camera 205 is a DVS sensor, and the second camera 209 is a CMOS type camera, which, while less efficient than a DVS sensor, can provide additional image data (for example, data regarding colors and elements of a scene whose brightness may not change at a level detectable by a DVS sensor) that is useful for object recognition. According to various embodiments, second camera 309 is an internally-facing camera that tracks the motion of a user's eyes, and by implication, the direction of the user's gaze. Gaze tracking can be used to support foveal rendering of items of AR content, which can conserve battery and processor resources by rendering items of AR content away from a viewer's gaze at lower resolutions.

According to certain embodiments, the apparatus 200 includes processor 211 and memory 213. In certain embodiments, the memory 213 contains program code, which when executed by processor 211, causes apparatus 200 to execute an XR application.

Referring to the non-limiting example of FIG. 2, the apparatus 200 includes an inertial measurement unit 215, which generates pose, and in some embodiments, location data associated with the motion of apparatus 200 along one or more degrees of freedom. In certain embodiments, data output from IMU 215 may be used for positioning (for example, to confirm a geospatial position of apparatus 200), or to determine the current pose, as well as present changes in pose (for example, rotations) of the pose of the apparatus 200.

In some embodiments, the apparatus 200 includes input/output interface 217. According to various embodiments, the I/O interface 217 provides communicative connectivity between the apparatus 200 and an electronic device, such as a smartphone or computer to which apparatus 200 is a companion device. According to certain embodiments, the I/O interface 217 connects the apparatus 200 over a network to an electronic device. I/O interface is, in certain embodiments, a wireless communication interface, such as a BLUETOOTH transceiver, or communication hardware supporting communications over one or more longer range wireless systems (for example, communication unit 110 in FIG. 1).

Figure 3:
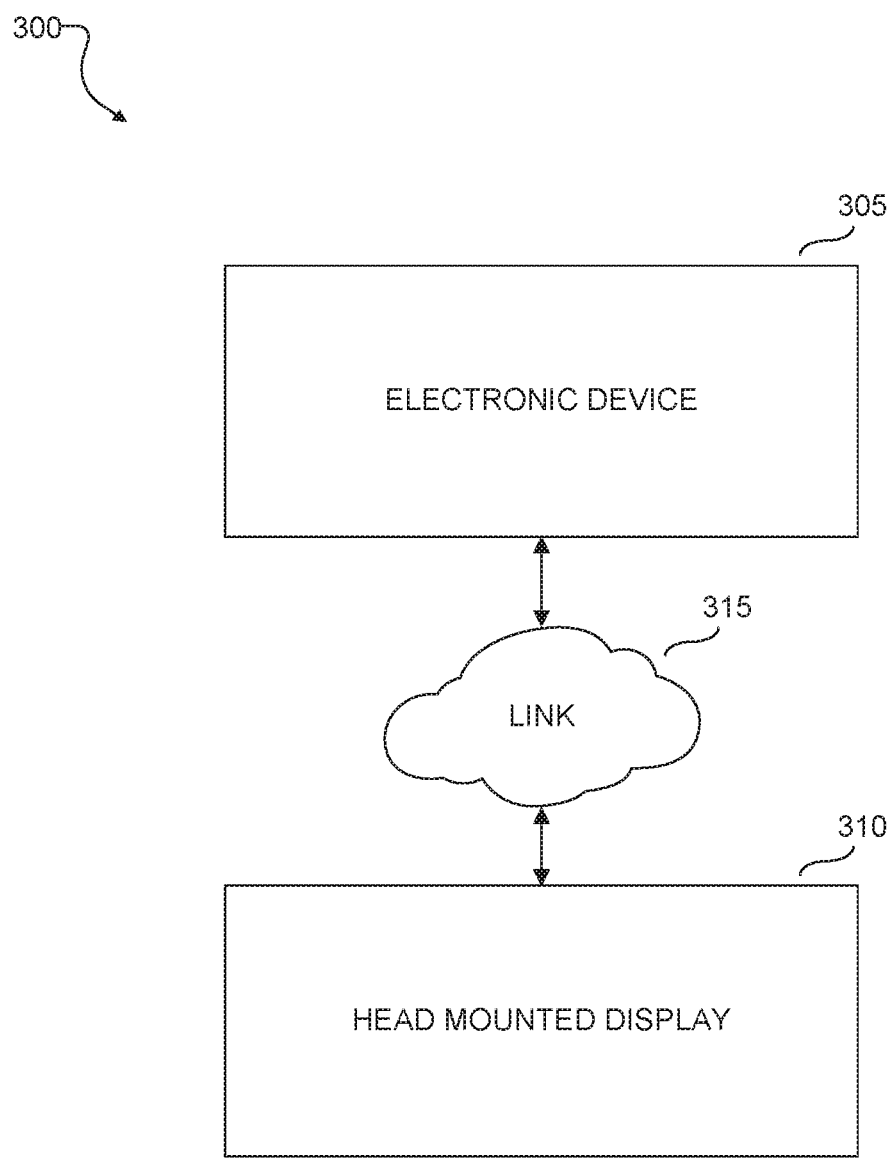
FIG. 3 illustrates an example of a network context for utilizing two or more devices to provide an extended reality (XR) display according to certain embodiments of this disclosure.

FIG. 3 illustrates an example of a network context 300 for utilizing two or more devices to provide an extended reality (XR) display according to various embodiments of this disclosure. The embodiment of the network context 300 shown in FIG. 3 is for illustration only and other examples could be used without departing from the scope of the present disclosure. As used in this disclosure, the term "extended reality" encompasses a video display that combines functionalities of virtual reality (VR), augmented reality (AR) and mixed reality (MR) displays. According to certain embodiments, an XR display can combine elements of a live view (for example, the world as seen through a camera of a device or a transparent projection surface of a set of "smart glasses") of a user's physical world, with digital elements presented to appear as dynamic (i.e., changing) three-dimensional (3-D) objects existing in, and interacting with the physical world as seen through the live view.

In many instances, the overall XR experience can be improved by apportioning the computational load associated with rendering and projecting the digital components of an XR display across two or more computing platforms. By having a separate device (for example, a tablet or smartphone) perform the often computationally expensive work of rendering pixels for display, the apparatus (for example, a head mounted display or smart glasses) upon which the XR display is viewed can be made lighter (for example, by having a smaller battery), or more comfortable (for example, by utilizing a lower-power processor which produces less heat).

Referring to the non-limiting example of FIG. 3, in certain embodiments according to this disclosure, an XR display is provided at a HMD 310 (for example, a device like apparatus 200 in FIG. 2), which is communicatively coupled to (i.e., can receive and send data), via a link 315 to an electronic device 305 (for example, a device like device 100 in FIG. 1). According to certain embodiments, electronic device 305 is physically separate from HMD 310, and has greater opportunity (for example, by virtue of a more powerful processor, a separate graphics processing card or chip, or has a housing better able to handle heat generated by a processor) to perform computationally demanding graphics rendering tasks than HMD 310.

Link 315 comprises a medium over which frame data (for example, rendered pixels) and digitized pose data can be sent and received between the electronic device 305 and HMD 310. According to some embodiments, the link 315 is a physical link, such as an Ethernet cable or fiber optic cable. According to certain embodiments, link 315 is a wireless link, such as a BLUETOOTH or WI-FI. In some embodiments, link 315 is associated with specific transmission protocols, such as 5G protocols, and has a finite capacity, or bandwidth with regard to the rate at which data can be passed between the electronic device 305 and the HMD 310.

FIG. 4 illustrates aspects of an XR viewing experience provided at an HMD (for example, HMD 310 in FIG. 3) according to certain embodiments of this disclosure. The example shown in FIG. 4 is for illustration only and other examples could be used without departing from the scope of the present disclosure.

Referring to the non-limiting example of FIG. 4, the physical components of an operating environment 400 for viewing an XR display on HMD 405 are shown in the top half of FIG. 4. As shown in this illustrative example, the operating environment 400 comprises a room with at least three fixed planar surfaces: floor 410, first wall 415 and second wall 420, each of which are physical objects with which digital objects may appear to interact with in an XR display. According to some embodiments, physical objects and digital objects in an XR display at HMD 405 appear to be subject to a common set of laws of physics, such as gravity, shown by arrow 425.

According to certain embodiments, the HMD 405 comprises an untethered head-mounted display (for example, the device 100 in FIG. 1) worn on a head of a user 401, such as a pair of sunglasses. In some embodiments, the HMD 405 comprises a clear lens 407 through which the user 401 can view objects in operating environment 400, and upon which the HMD 405 can project digital objects into user 401's field of view to provide an extended reality display.

According to certain embodiments, the features of an XR display include digital content that is displayed to a viewer, such that it appears like a physical object within the live view of the physical world. The digital objects are, in some embodiments, dynamic, in at least the following two regards. First, the digital objects comprise animated content, which changes appearance independently of the pose of the apparatus (for example, HMD 405) providing the XR display, and for which the displaying device needs to receive pixels corresponding to the changes in the digital object. Second, the digital objects are, in some embodiments, also dynamic in the sense that their appearance changes with the pose of the viewing apparatus, irrespective of whether pixels corresponding to changes in the underlying digital object have been received. As used in the context of this disclosure, the expression "pose" refers to a coordinate expression of current viewpoint of a display providing an XR display. According to some embodiments "pose" can be expressed as values in a coordinate system having six degrees of freedom, such as a coordinate system having three orthogonal transverse axes (for example, axes capturing movement of the display up and down, left and right and back and forth) and three orthogonal axes of rotation (for example, axes capturing yaw, pitch and roll movements). In certain embodiments, where the display providing the XR display is an apparatus worn on a viewer's head (for example, HMD 405), the "pose" of the display apparatus is generally coextensive with the viewer's "head pose" or pose.

Referring to the non-limiting example of FIG. 4, a clock 440 is shown to illustrate an example of a digital object provided in an XR display. As shown in the top view of operational environment 400, wall 420 is bare. However, as shown in the second view of operational environment 400, that clock 440, which is a digital object displayed in an XR view of operational environment 400, is visible through HMD 405. According to some embodiments, the clock 440 is dynamic in the sense that the underlying source content presented to user 401 through HMD 405 changes (for example, the hands move over time), and also in the sense that the clock 440 changes appearance in response to changes in pose, such as, by getting larger as user 401 gets closer to wall 420, or is reprojected to reflect lateral movement by user 401's position within operational environment 400.

Figure 5:
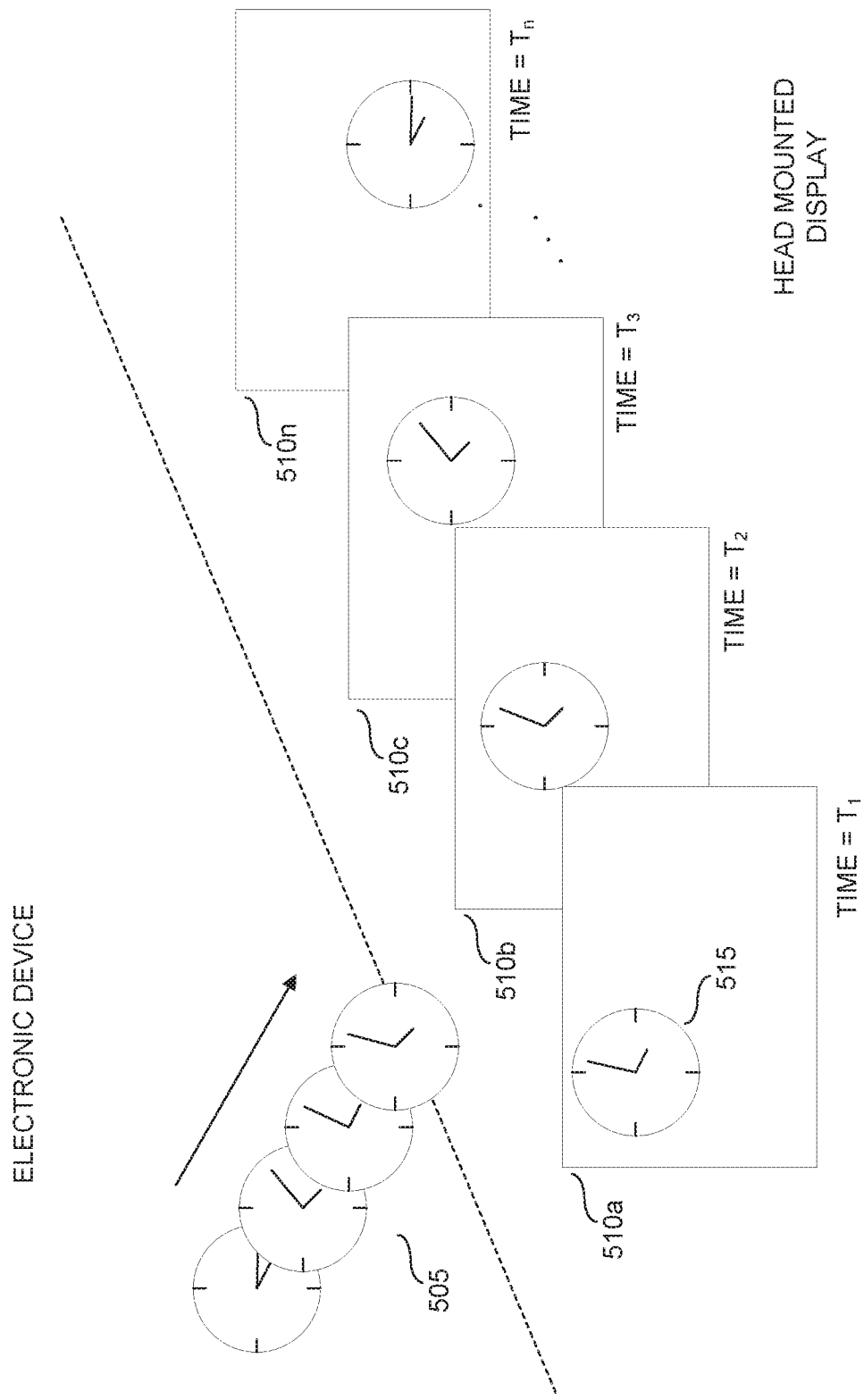
FIG. 5 illustrates aspects of providing an XR display according to certain embodiments of this disclosure.

FIG. 5 further illustrates aspects of providing an XR display according to various embodiments of this disclosure. The embodiment of the aspects of providing an XR display shown in FIG. 5 is for illustration only and other embodiments could be used without departing from the scope of the present disclosure.

Referring to the non-limiting example of FIG. 5, an electronic device renders pixels associated with image data to be presented at a later times (for example, at regular intervals beginning 100 milliseconds (ms) in the future) as a series of frames (for example, frames 510a through 510n) on a display of the HMD. The rendered pixels 505 are transmitted from the electronic device over the link to the HMD, where the rendered pixels are incorporated into the series of frames (510a-510n) presented in succession at predetermined times (for example, times $t_1$ through $t_n$), to provide an XR display.

As shown in the explanatory example of FIG. 5, the appearance of digital objects produced from rendered pixels 505 within an XR display is multiply dynamic in that the source image changes over time (for example, the positions of the hands of clock 515 change over frames 510a through 510n). Similarly, the appearance of digital objects in the XR display provided through the successive presentation of frames 510a through 510n is dynamic in the sense that the position and projection (for example, the viewing angle) of digital objects within the XR display changes in response to changes in the pose of the MID. As illustrated in the explanatory example of FIG. 5, the overall position of clock 515 moves within the space of the frame changes across frames 510a through 510n in response to changes in the pose of the MID. According to some embodiments, the changes in projection of digital objects within the constituent frames of an XR display in response to changes in pose is handled, in part or in whole, by one or more processors (for example, CPU 211 in FIG. 2) based on pose data obtained by one or more motion sensors (for example, IMU 215 in FIG. 2) of the HMD.

Figure 6:
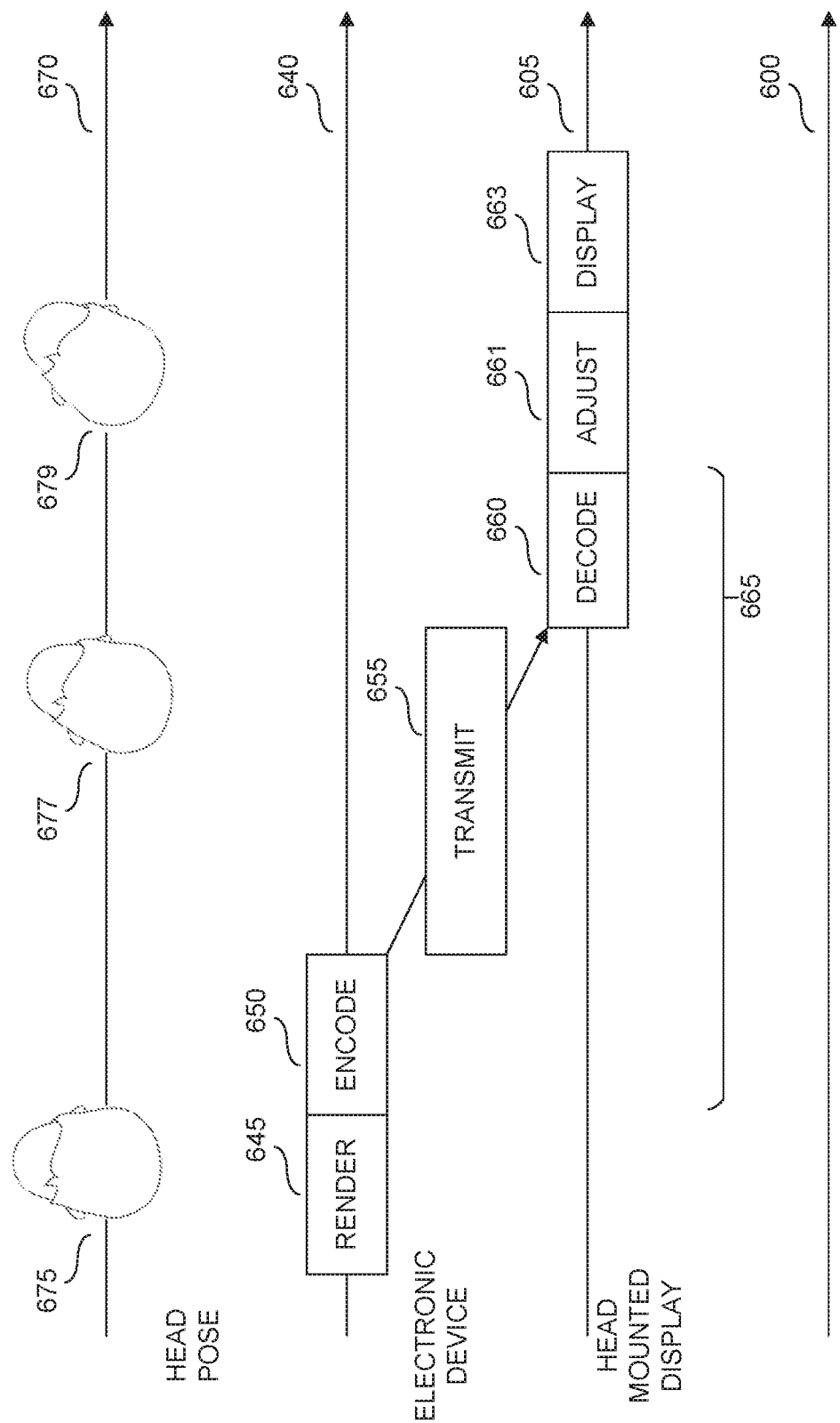
FIG. 6 is an example further illustrating aspects of providing an XR display at an HMD based on pixels passed over a data link from an electronic device according to certain embodiments of this disclosure.

FIG. 6 is an example further illustrating aspects of providing an XR display at an HMD based on pixels passed over a data link from an electronic device according to various embodiments of this disclosure. The embodiment of the aspects of providing an XR display shown in FIG. 6 is for illustration only and other embodiments could be used without departing from the scope of the present disclosure.

Referring to the illustrative example of FIG. 6, four synchronous timelines are shown in FIG. 6. A first timeline 600 depicts a current time to which the other three timelines in FIG. 6 are synchronized. A second timeline 605 depicts activity intervals (i.e., time periods over which processes are performed) occurring at an HMD (for example, HMD 310 in FIG. 3). A third timeline 640 depicts activity intervals occurring at an electronic device (for example, electronic device 305 in FIG. 3). A fourth timeline 670 depicts the current pose (as expressed through the position of a user's head) of the HMD associated with second timeline 605.

According to certain embodiments, including, for example, embodiments in which the link (for example, link 315 in FIG. 3) between the electronic device and the UN/ID has limited bandwidth, the computational workload of providing a multiply dynamic XR display, such as described with reference to FIGS. 4 and 5, includes managing the computational load associated with reprojecting objects in the XR display due to pose changes occurring during the process of transmitting rendered pixels from the electronic device to the HMD. Put differently, in certain embodiments according to this disclosure, pixels are rendered at an electronic device at a first time, transmitted to the HMD, and at a second time, are adjusted for the current pose in advance of being displayed as part of an XR display provided by the MID. As discussed elsewhere herein, the interval between the first time, at which pixels for an XR display are rendered at an electronic device, and the second time, at which the pixels are available for pose adjustment in preparation for display, presents a performance bottleneck for systems for providing an XR display across two computing platforms. Further, addressing the above-described performance bottleneck without adversely affecting (for example, by increasing battery consumption or diminishing resolution) remains a source of technical challenges and opportunities for improvement in the art.

Referring to the non-limiting example of FIG. 6, at the start of a first time interval 645, the electronic device (or a process thereof, such as a graphics pipeline) receives a source image (for example, a vector representation of a scene) from an application supporting the XR display provided at the HMD. During time interval 645, the rendering device renders the source image as pixels for display at the MID. According to certain embodiments, the rendering processes performed over interval 645 include, without limitation, shading and generating surface textures of digital objects appearing in the XR display provided at the MID.

As illustrated by fourth timeline 670, during interval 645, the pose coordinates for the companion display have values associated with a first pose 675 (represented in the figure by the head facing due north in the image). However, as illustrated by the second pose 677 and the third pose 679, a pose can change between rendering a set of pixels for display and actually displaying them as part of a pose-adjusted XR display.

Skilled artisans will appreciate that the duration of interval 645 relative to other intervals shown in FIG. 6 can vary based on a range of potentially interrelated variables, including without resolution, the frame-over-frame changes in the source images to be rendered, the desired resolution at the MID, and available system resources.

Interval 645 concludes when a set of pixels associated with a particular frame (for example, frame 510*b* in FIG. 5) to be displayed at the companion device at a predetermined point in time, as part of a predetermined sequence of frames are rendered, and need to be sent from the electronic device to the HMD.

According to some embodiments, rendered pixels are encoded prior to transmission over an encoding interval 650. In some embodiments, during encoding interval 650, the rendered pixels are compressed using one or more video compression algorithms (for example, x265 compression), to reduce the volume of bytes required to send the rendered pixels. The duration of encoding interval 650 can depend on a variety of interrelated factors, including, without limitation the amount of pixel data to be encoded, the available processor resources for encoding, and the tolerance of the XR system for latency between rendering and display. Additionally, in some embodiments, the encoding interval 650 may be temporarily or permanently avoided, as other factors, such as, for example, the available bandwidth in the link between the electronic device and UN/ID are such that it is more efficient not to compress pixels prior to transmission.

Skilled artisans will appreciate that, the duration of interval overall, and relative to other intervals shown in the illustrative example of FIG. 6 depends on a number of potentially interrelated factors, including without limitation, the amount of data to be compressed, the desired resolution of an XR display, the time until display, and the compression algorithm used for encoding.

According to certain embodiments, pixels rendered over interval 645, and in certain embodiments, encoded over interval 650 are transmitted from the electronic device to the HMD over a data link (for example, link 315) over a transmission interval 655. Depending on the format of the data link between the electronic device and the MID, the pixels are transmitted according to one or more specified communication protocols, including, without limitation, BLUETOOTH, WI-FI, LTE or 5G protocols. The duration of transmission interval 655 in total, and relative to other intervals described with reference to the illustrative example of FIG. 6 can depend on a variety of potentially interrelated factors, including without limitation, the quality of the connection between the HMD and electronic device, system constraints on battery and processor resources for transmission, and the volume of pixel data to be transmitted from the electronic device to the HMD.

In some embodiments, transmission interval 655 concludes when all the pixels have been sent (or attempted to be sent) to the HMD. In embodiments in which the pixels were encoded at the electronic device prior to transmission (for example, by compressing the pixel data using one or more compression algorithms), upon receipt at the HMD, the pixels are decoded in preparation for display over a decoding interval 660, during which the HMD applies one or more decompression algorithms to restore the pixel data to a format suitable for pre-display correction. Depending on embodiments, the duration of decoding interval 660, both in total, and relative to other intervals shown in FIG. 6 can depend on a variety of interrelated factors, including, without limitation, the choice of algorithm used to encode the data, the available processing and battery resources at the HMD, and constraints on permissible operating temperature at the HMD (for example, whether the heat caused by the processor load causes the device to become uncomfortably hot for the user).

Referring to the non-limiting example of FIG. 6, at the conclusion of decoding interval 660, the pose of the HMD has, during the time between the conclusion of rendering interval 645 and the conclusion of decoding interval 660, shifted from a first pose 675, through a second pose 677, to a third pose 679. Put differently, the HMD's perspective of the live view has changed in the time between rendering a frame of pixels at the electronic device and receiving the pixels at the MID, such that, absent adjustment of the projection of the image data in the XR display, the mapping between digital objects embodied as rendered pixels and the live view of the physical world will be off due to the change in pose. Referring to the illustrative example of FIG. 4, the change in pose over intervals 650, 655 and 660 in FIG. 6 would appear in the XR display of FIG. 4 as clock 440 appearing to arbitrarily move around on wall 420. For many applications, such movement is undesirable in an XR display, and can induce motion sickness in some viewers.

During adjustment interval 661, to adjust for changes in pose coordinates between first pose 675 and third pose 679, the HMD reprojects, or warps (also referred to herein as a "reprojection warp" or an "image reproduction warp") the pixels received from the electronic device, according to a changed coordinate system, reflecting the change in pose between over the interval between rendering at the electronic device and reception at the HMD. In this way, the perspective of the digital object defined by the rendered pixels within the XR display is adjusted to reflect the change in pose of the HMD. Examples of algorithms for reprojecting the rendered pixels include, without limitation, the gdalwarp utility of the Geospatial Data Abstraction Library ("GDAL").

According to certain embodiments, the duration of adjustment interval 661, both in absolute terms, and relative to other intervals described in the explanatory example of FIG. 6 depends on a number of potentially interrelated factors, including, without limitation, the extent to which the pose of the HMD has changed over the interval between rendering and reception at the HMD, the resolution of the XR display utilizing the received pixels, and the processing resources of the MID.

Referring to the non-limiting example of FIG. 6, adjustment interval 661 concludes when the received pixels are reprojected according to a shifted coordinate system to account for the change from first pose 675 to third pose 679. The rendered and corrected pixels are displayed as a frame of an XR display over a display interval 663. According to certain embodiments, the duration of display interval 663 depends on a current frame rate of the XR display provided at the HMD. In some embodiments, the frame rate at the HMD depends, at least in part, on the speed with which the electronic device can provide correction-ready pixels to the MID.

As described with reference to FIG. 6, the interval 665 between the end of rendering interval 645 and the start of adjustment interval 661, represents, for certain embodiments, a performance bottleneck for providing an XR display at a HMD based on pixels rendered at an electronic device. For example, the longer the interval 665 becomes, the greater the opportunity for the pose of the HMD to change becomes, and the more processing to reproject the image to account for the changed pose needs to be performed at the HMD.

As noted elsewhere in this disclosure, the overall performance of an XR system comprises a variety of interrelated dimensions, including, without limitation, system cost, frame rate of an XR display, resolution of the XR display, battery life, processor consumption and heat generated at the HMD. While interval 665 could, potentially, be shortened by providing one or both of the electronic device or HMD with processing greater resources for compression or decompression, such a change would foreseeably come at the cost of enhanced battery consumption (for example, from a more powerful processor), or less processing resources available for other system processes. Similarly, the time associated with compressing and transmitting full frames of video data can be reduced by lowering the resolution of the XR display provided at the MID, but this approach necessarily diminishes the quality of the digital objects at the display. As a still further example, more efficient compression algorithms could be used to reduce the volume of data sent across the link to the HMD, but such algorithms may require more time to execute or additional processing resources. Thus, shortening interval 665 without diminishing one or more dimensions of the overall performance of an XR system remains a source of technical challenges and opportunities for improvement.

Figure 7A:
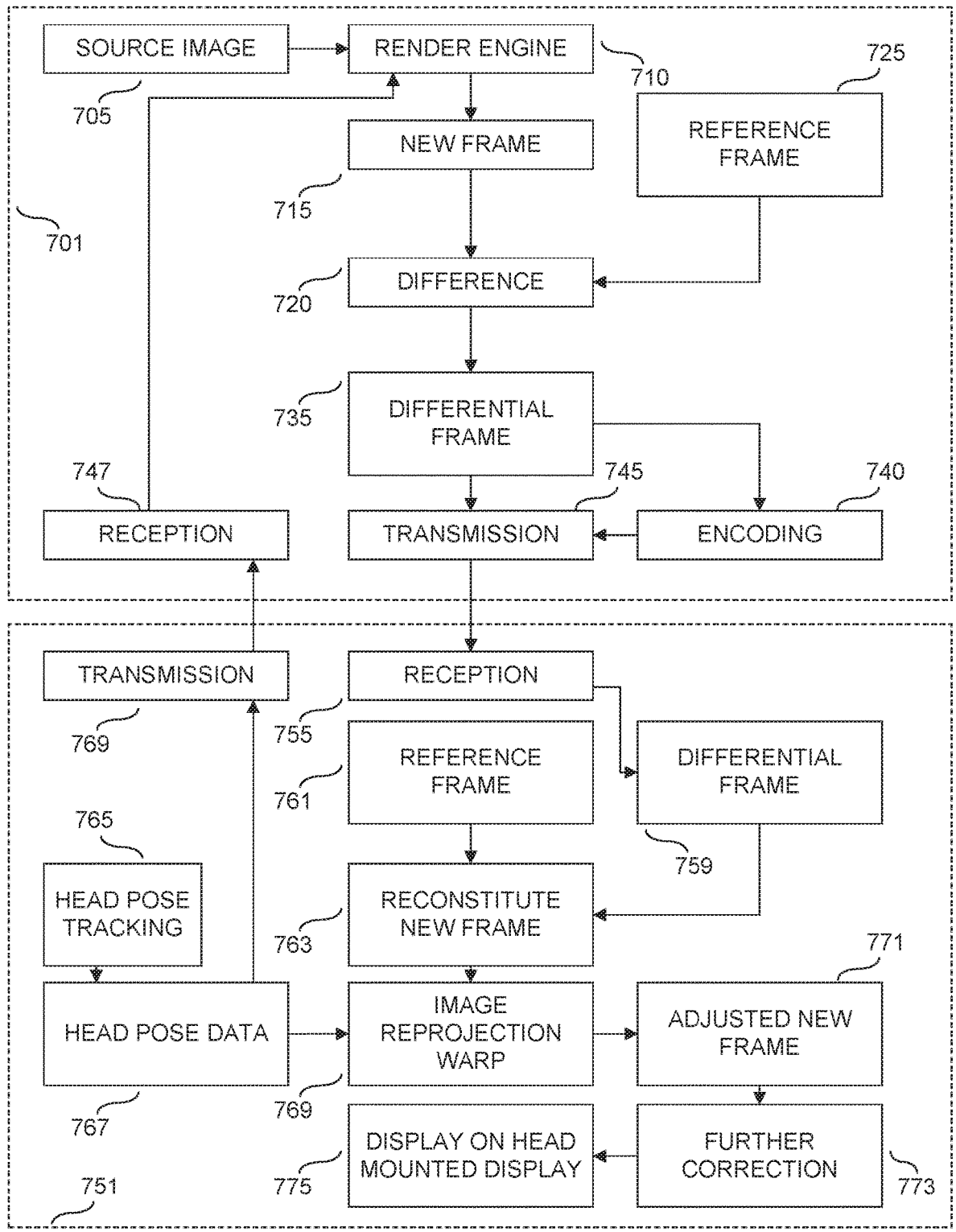
FIGS. 7A and 7B illustrate, in block diagram format, examples of architectures for reducing a data communication load through lossless data reduction according to certain embodiments of this disclosure.
Figure 7B:
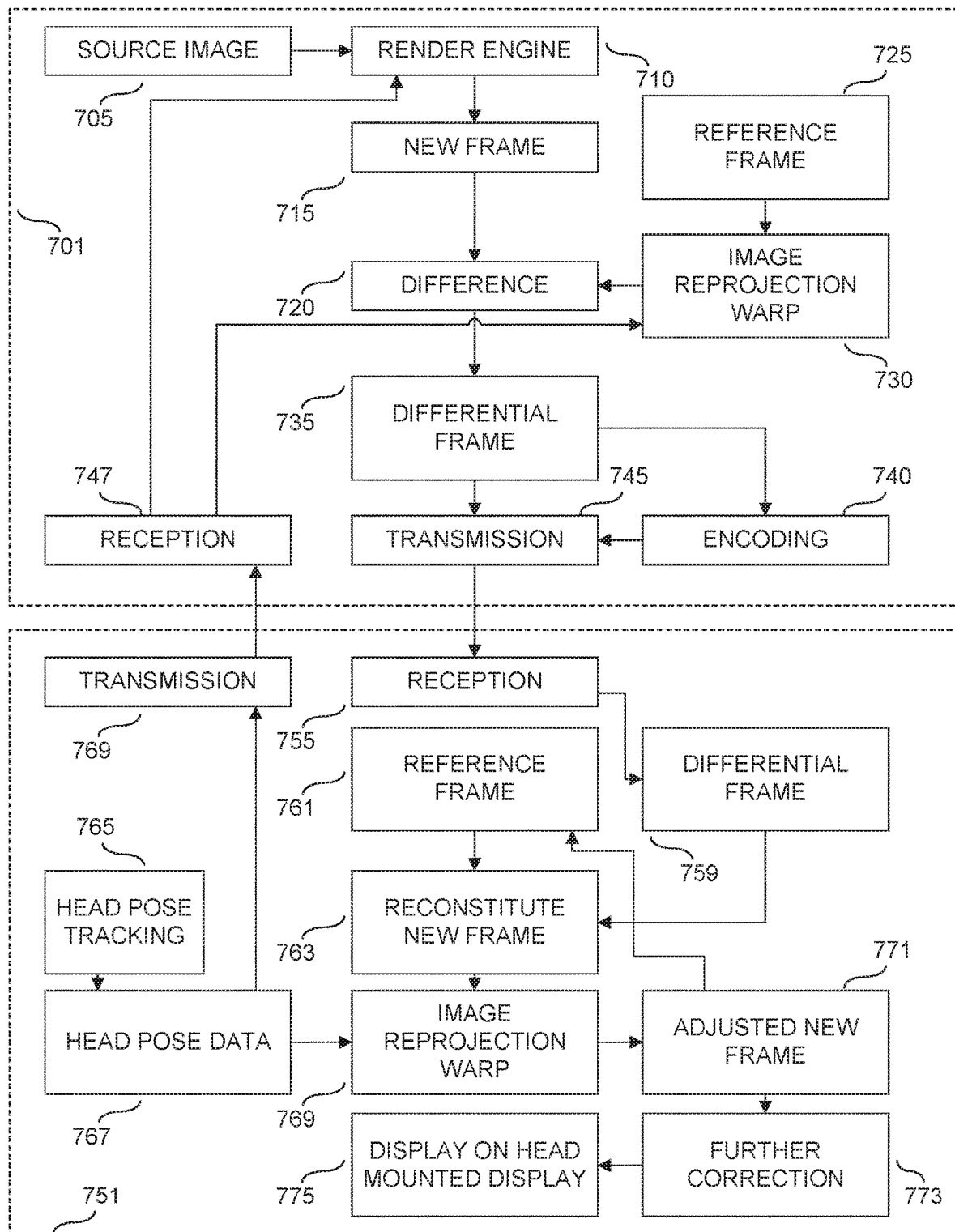

FIGS. 7A and 7B illustrate, in block diagram format, examples architectures for reducing a data communication load through lossless data reduction according to various embodiments of this disclosure. For convenience of cross-reference, elements common to both the example of FIG. 7A and FIG. 7B are numbered similarly. The embodiments shown in FIGS. 7A and 7B are for illustration only. Other embodiments could be used without departing from the scope of the present disclosure.

As noted with reference to FIG. 6 of this disclosure, reducing the interval between completing rendering at an electronic device and having rendered pixels ready for pose correction at the electronic device, while at the same time, not compromising other dimensions of the performance of the system as a whole, presents a technical challenge and opportunities for improvement in the overall performance of XR systems. Certain embodiments according to this disclosure, including those described with reference to FIGS. 7A and 7B effect such a reduction in the above-described interval without imposing new costs on other dimensions of the overall performance of the system by sending fewer (as compared to consistently sending full frames of XR images), but better (in terms of the recency of the pose data used to render images at the electronic device) pixels from the electronic device to the MID.

Referring to the non-limiting example of FIG. 7A, the architecture comprises an electronic device 701 (for example, device 100 in FIG. 1), which is communicatively linked (for example, via a link (for example, link 315) to a HMD 751 (for example, HMD 405 in FIG. 4)).

According to various embodiments, the process for rendering a frame in a sequence of frames (for example, frames 510a through 510n in FIG. 5) to be presented as an XR display at a HMD begins when a source image 705 is passed to a rendering engine 710 executing on the electronic device 701. In this explanatory example, source image 705 corresponds to image data (for example, vector or other non-pixel level) generated by an application supporting an XR display, which corresponds to a frame to be rendered at the electronic device and then sent to the HMD for viewing. For reference, source image 705 corresponds to the nth frame in a sequence of frames, with the n−1th frame corresponding to the immediately preceding frame, and the n+1th frame corresponding to the frame after the nth frame.

In the explanatory example of FIG. 7A, the rendering engine 710 comprises an application or process executing on electronic device 701 for rendering scene-level data output by an application as pixels for display. Examples of graphics pipelines which can operate as rendering engine 710 include, without limitation, the OpenGL Rendering Pipeline for ANDROID® devices and the Metal Graphics Pipeline for iOS devices. According to certain embodiments, rendering engine 710 determines shading values and textures for content appearing as digital objects in the XR display presented at HMD 751.

According to certain embodiments, the rendering engine 710 outputs a new frame 715 based on source image 705. As described in this example, new frame 715 is the nth frame in a sequence of frames rendered by electronic device 701 for transmission to, and projection at HMD 751. In certain embodiments, the content of the new frame 715 is rendered to present digital objects from a vantage point based on a known or predicted pose of the HMD. According to some embodiments, pose information (for example, time-stamped IMU data, or a prediction of the HAMID's pose at a given time) is obtained from one or more sensors (for example, IMU 215 in FIG. 2) of the HMD via a data link connecting the electronic device and HMD.

Referring to the non-limiting example of FIG. 7A, at block 720, the electronic device performs a difference operation between new frame 715 and a reference frame 725 stored in a memory of the electronic device. The difference operation performed at block 720 identifies pixels unique to new frame 715. According to certain embodiments, the reference frame 725 comprises a copy of the previous (or n−1th frame) rendered by rendering engine 710, based on source image data generated prior to source image 705.

According to certain embodiments, electronic device 701 generates, based on the difference operation performed at block 720, a differential frame 735 comprising pixels unique to new frame 715. As noted previously, in most cases, the frame-over-frame differences between frames decrease as the length of the interval between frames decreases. Thus, in many real world applications, where digital content is rendered to be comfortably viewed by a human user (for example, at a frame rate such that objects appear to move smoothly, and at the same time, without flashing content on the screen for periods too short to be perceived), a significant portion of the pixels of a given frame are likely to be the same as the pixels of the previous frame. Thus, as an alternative to sending an entire frame from electronic device 701 to HMD 751, a differential frame, comprising the difference (or just the changes) between new frame 715 and reference frame 725 is generated. According to certain embodiments, the relationship between the reference frame, the differential frame and the new frame can be expressed by the following equations:

$$\text{Frame(new)} \quad \text{Frame(ref)} \quad \text{Frame(diff)} \qquad (1)$$

$$\text{Frame(diff)} \quad \text{Frame(ref)} \quad \text{Frame(new)} \qquad (2)$$

According to Equation 1, the content of a differential frame (Frame(diff)), comprises the set of pixels of a new frame (Frame(new)), from which the pixels common to a reference frame (Frame(ref)) have been subtracted out, to leave only the subset of pixels of the new frame which are unique to the new frame. Similarly, according to Equation 2, the new frame (Frame(new)), can be reconstituted by combining the pixels of the reference frame with those unique to the differential frame (Frame(diff)) with those of a reference frame. As such, if the electronic device 701 and the HMD 751 each maintain a copy of the reference frame 725, the image data for a new (n+1th) frame can be provided, without loss of data, from electronic device 701 to HMD 751 by sending only a differential frame, rather than a complete frame. In this way, the amount of data to be sent over the link between electronic device 701 and HMD 751 can be reduced, thereby reducing the length of the time (for example, interval 665 in FIG. 6) between rendering at the electronic device and reception at the HMD. In simple terms, in certain embodiments according to the present disclosure, electronic device 701 provides HMD 751 with a reduced set of pixels (i.e., differential frame 735), as compared to a full frame, thereby reducing the communication load between electronic device 701 and HMD 751 without a loss of image data. In this way, embodiments according to the example of FIG. 7A can improve the overall performance of electronic device 701 and HMD 751 as a system for providing an XR display without negatively affecting any other dimensions of system performance, such as battery life or hardware requirements.

Referring to the non-limiting example of FIG. 7A, in certain embodiments, the differential frame 735 is encoded at block 740, to reduce the data size and allow for faster transmission. According to some embodiments, the differential frame is encoded using one of a plurality of possible encoding modes. In certain embodiments, the encoding modes include, without, different (or no) compression algorithms, or different quality/speed presets for a given compression algorithm. As one non-limiting example, the x.265 compression algorithm provides ten compression speed presets, ranging from "ultrafast" to "placebo." In certain embodiments, each of these presets may comprise a compression mode.

In certain embodiments, the encoding mode of the plurality of encoding modes is selected based on a contextual factor, such as the size of the differential frame, or head pose data received from the HMD.

Subsequent to generating a differential frame 735, and where applicable, encoding the differential frame at block 740, at block 745, the electronic device 701 transmits the differential frame to HMD 751 via one or more communication links (for example, link 315 in FIG. 3).

At block 755, the HMD 751 receives the differential frame, via the link from electronic device 701, and differential frame 759 is available for further processing at HMD 751. In embodiments where the differential frame has been previously encoded (for example, at block 740, the differential frame is decoded such that an uncompressed differential frame 759 from which new frame 715 can be reconstituted at HMD 751 is available).

According to certain embodiments, the HMD 751 obtains, from a memory of the device, a reference frame 761. In this non-limiting example, reference frame 761 comprises an HMD device copy of reference frame 725.

According to certain embodiments, at block 763, HMD 751 reconstitutes new frame 715 by combining reference frame 761 with differential frame 759, according to Equation 2 herein. In this non-limiting example, the pixels unique to the new frame 715 provided in differential frame 759 replace certain pixels of the reference frame 761, thereby updating the frame. In the non-limiting example of FIG. 7A, the new frame generated at block 763 is stored in a memory of the HMD as a reference frame.

At block 765, one or more sensors of the HMD (for example, IMU 215 in FIG. 2) obtain tracking measurements associated with the pose of the HMD at a time subsequent to generation of new frame 715 at electronic device 701. According to certain embodiments, the tracking measurements obtained at block 765 are, as necessary, processed as head pose data 767. In certain embodiments, the head pose data 767 comprises time-stamped data associated with a recorded pose of the HMD. In various embodiments, the head pose data 767 comprises a predicted head pose of the HMD at a future time.

In certain embodiments, at block 769, head pose data 767 is transmitted from HMD 751 to electronic device 701. Upon reception at electronic device 701 at block 747, the head pose data is provided to rendering engine 710 to provide updated perspective information for rendering subsequent source image.

Referring to the non-limiting example of FIG. 7A, an image reproduction warp of the reconstituted new frame based on head pose data 767 is performed at block 769, thereby updating the projection of new frame 715 based on the most recent available head pose data. Further, as noted previously, the most recent available head pose data (in this case, head pose data 767) is, in some embodiments also transmitted back to electronic device 701, where it can be used, for example, to improve the recency of the perspective information used by rendering engine 710 in generating the next frame to be transmitted to HMD 751.

According to some embodiments, the image reprojection warp performed at block 769 produces a pose-adjusted new frame 771.

Referring to the illustrative example of FIG. 7A, in certain embodiments, the pose-adjusted new frame 771 is further corrected at block 773. According to some embodiments, the further corrections performed at block 773 comprise correcting for distortions produced during the image reproduction warp, and removing artifacts from the reprojected frame prior to display.

In some embodiments according to this disclosure, at block 775, the pose-adjusted new frame is displayed by the head mounted display for a predetermined time (for example, $1/60^{th}$ of a second, in embodiments with a 60 frame-per-second frame rate) as one frame of a sequence of frames providing an XR display at the HMD.

FIG. 7B illustrates, in block diagram format, another example of an architecture for reducing a data communication load through lossless data reduction according to certain embodiments of this disclosure. As previously noted, blocks and elements common to FIGS. 7A and 7B are numbered similarly.

In certain embodiments, the performance of electronic device 701 and HMD 751 can be enhanced by improving the recency of the differential frame relative to the time of display, so that there is less opportunity for changes in head pose, and by implication, potentially less processing at HMD 751 to adjust for intervening change in head poses. By reducing the processing load associated with pose adjustment at HMD 751, the overall performance of electronic device 701 and HMD 751 as a system for providing an XR display can be improved without compromising other dimensions of the system's performance.

Referring to the non-limiting example of FIG. 7B, in some embodiments, to help reduce the size of differential frame 735 that is sent from electronic device 701 to HMD 751, an image reprojection warp 730 is performed on reference frame 725, based on pose data provided by the HMD. According to certain embodiments, the pose data provided by the HMD is the same pose data used by the HMD to adjust the projection of the n−1th frame prior to display. In some embodiments, the pose data provided by the HMD is a predicted pose for a point in time between rendering of the reference frame and the new frame.

According to various embodiments, the frame-over-frame differences (for example, the number of pixels unique to a given frame) between successive frames decreases as the interval between the times with which the frames are associated with decreases. According to certain embodiments, the image reprojection warp 730 "updates" the pixels of reference frame 725 to account for pose changes subsequent to rendering. Put differently, if reference frame 725 is initially associated with a time t=0 (in this example, the time of rendering), and the new (nth) frame is associated with time t=1 (in this example, the time of rendering), image reprojection warp 730 "moves up" the time with which reference frame 725 is associated to the time of the pose data used to perform image reprojection warp 730. Thus, if the pose data to perform image reprojection warp 730 was obtained at time t=0.5, reference frame 725 is, post image reproduction warp, no longer associated with time t=0, but rather, time t=0.5.

According to certain embodiments, at block 720, a difference operation is performed between new frame 715, and the reference frame, as updated image reprojection warp 730 to identify pixels unique to new frame 715. Further, according to various embodiments, the updated reference frame is stored in a memory of electronic device 701 as a reference frame.

In this non-limiting example, by performing an image reprojection warp of a reference frame prior to performing a difference operation between the reference frame with the new frame, the "quality" (in terms of recency and degree of adjustment to match a current pose at the MID) of the pixels of the differential frame can be improved.

Figure 8:
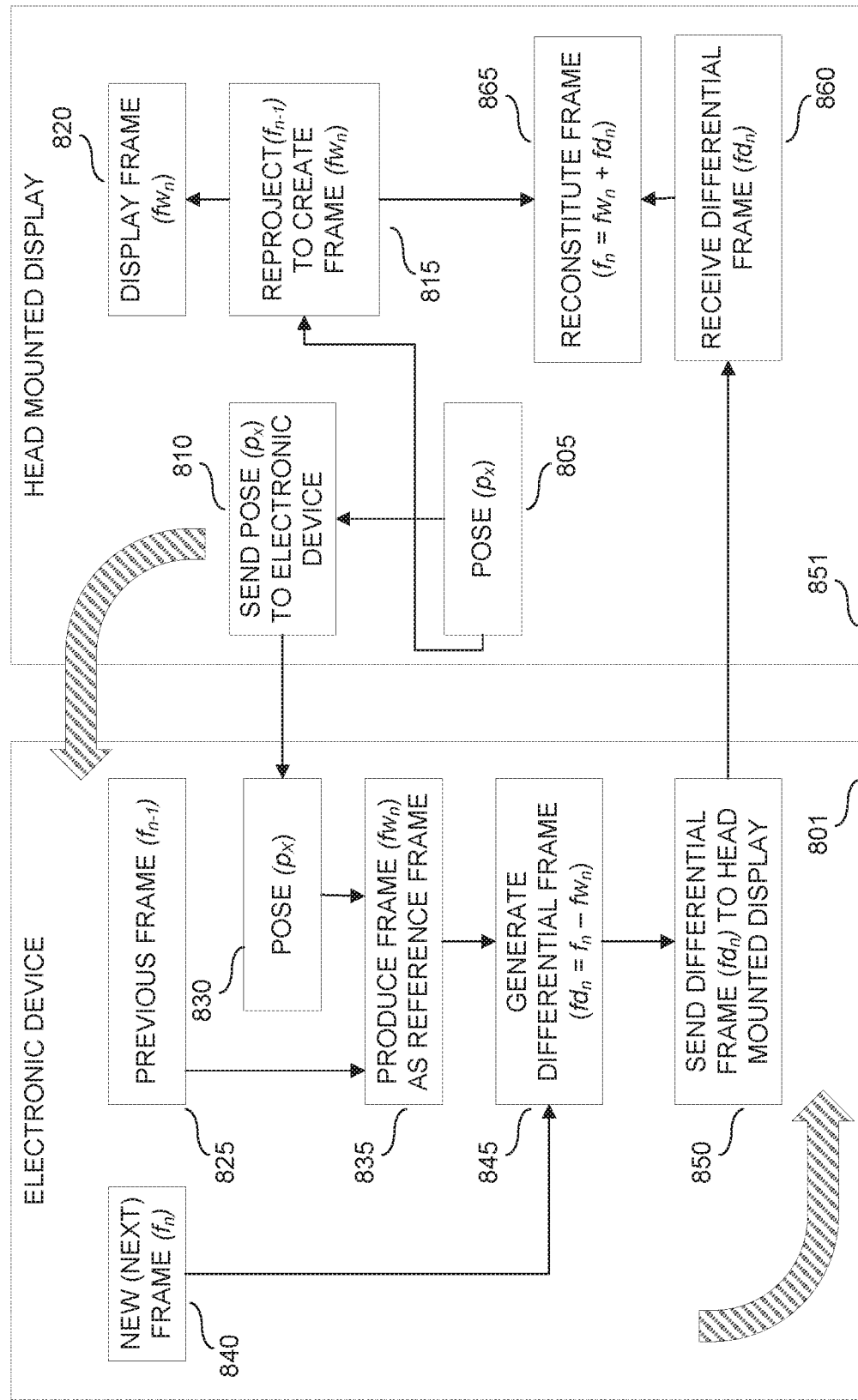
FIG. 8 illustrates aspects of an example of a process for reducing a data communication load through lossless data reduction according to certain embodiments of this disclosure.

FIG. 8 illustrates aspects of an example of a process 800 for reducing a data communication load through lossless data reduction according to certain embodiments of this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by respective processors in, for example, an electronic device and an MID.

Referring to the non-limiting example of FIG. 8, the operations of process 800 are practiced on two computing platforms, in this case, an electronic device 801 (for example, electronic device 100 in FIG. 1), and a head mounted display (TIMID) 851 (for example, HMD 405 in FIG. 4, or HMD 751 in FIG. 7A) communicatively connected over a link (for example, a WI-FI or BLUETOOTH connection).

As shown in the illustrative example of FIG. 8, at block 805, HMD 851 generates pose data ($p_x$) associated with the current pose of the apparatus. According to certain embodiments, pose data ($p_x$) comprises predicted pose data associated with a future time. In some embodiments, pose data ($p_x$) comprises data output by one or more sensors of the HMD, such as an accelerometer, IMU or internal gyro associated with a particular time value. According to certain embodiments, at block 810, pose data ($p_x$) is sent from HMD 851 to electronic device 801, for, without limitation, updating a reference frame in preparation for generating a differential frame to be subsequently provided to HMD 851. As shown in the illustrative example of FIG. 8, at block 815, pose data ($p_x$) is used to perform an image reproduction warp of a previously reconstituted frame ($f_{n-1}$), to adjust for changes in HMD pose arising during the time between the time frame ($f_{n-1}$) was rendered and the present moment. Subsequent to performing the image reprojection warp, frame ($f_{n-1}$) is re-designated as frame ($fw_n$). According to certain embodiments, frame ($fw_n$) is stored in a memory of HMD 851 as a reference frame.

As shown in the illustrative example of FIG. 8, frame ($fw_n$) is displayed on HMD 851 as one frame of a sequence of frames comprising an XR display provided at HMD 851.

As noted elsewhere herein, certain embodiments according to this disclosure provide the dual technical benefits of reducing the load on the link (for example, link 315 in FIG. 3) connecting the electronic device 801 and the UN/ID 851, while at the same time, improving the quality (in terms of both the recency of the pixels provided, and avoiding data loss through compression) of the pixels provided to the HMD. According to certain embodiments, these technical benefits are provided by, without limitation, sending differential frames from the electronic device 801 to the UN/ID 851, and improving the recency of the differential frames by sending pose data from the HMD 851 to electronic device 801. In this way, pixels rendered at the electronic device 801 are rendered based on more recent head pose data, thereby reducing the frame-over-frame difference between a frame as rendered and the frame as adjusted by an image reproduction warp to account for subsequent changes in head pose.

At operation 825, the electronic device 801 begins the process of generating a differential frame to be transmitted to UN/D 851, by obtaining a previous frame ($f_{n-1}$) from a memory of electronic device 801. In this non-limiting example, previous frame ($f_{n-1}$) is associated with an earlier time than pose data ($p_x$). According to certain embodiments, electronic device receives pose data ($p_x$) from HMD 851 at block 830.

According to certain embodiments, at operation 835, electronic device 801 performs an image reproduction warp of previous frame ($f_{n-1}$) based on pose data pose data ($p_x$) to produce a copy of ($fw_n$) at electronic device 801, which, in this illustrative example, is associated with the same time as pose data ($p_x$), which is more recent than previous frame ($f_{n-1}$).

At operation 840, electronic device 801 renders a new frame ($f_n$), comprising the underlying image data of a pose-adjusted frame to be displayed on the HMD subsequent to frame ($fw_n$) as part of a sequence of frames providing an XR display.

In some embodiments, at operation 845, the electronic device 801 generates a differential frame ($fd_n$) by applying the relationship set forth in Equations 1 and 2 of this disclosure. Specifically, at operation 845, the electronic device 801 performs a difference operation between the pixels common to new frame ($f_n$) and reference frame ($fw_n$), to produce a differential frame ($fd_n$) comprising the subset of pixels unique to new frame ($f_n$). As shown in the figure, the contents of differential frame ($fd_n$) can be represented by the equation ($fd_n=f_n-fw_n$).

At operation 850, electronic device sends differential frame ($fd_n$) to HMD 851, and differential frame ($fd_n$) is received at HMD 851 at operation 860. According to some embodiments, at operation 865, new frame ($f_n$) is reconstituted as $fw_n+fd_n$, and process 800 is reiterated with new pose data.

FIG. 9 illustrates aspects of the technical benefits realized by certain embodiments of this disclosure. The examples shown in FIG. 9 are for illustration only and other examples could be used without departing from the scope of the present disclosure.

As noted elsewhere herein, in some embodiments, there is a two-way flow of data between the electronic device (for example, electronic device 701 in FIG. 7A) and the HMD (for example, HMD 851 in FIG. 8), wherein the electronic device sends the UN/ID differential frames (as opposed to full frames), and the HMD sends the electronic device pose data. By sending differential frames, the volume of data sent from the HMD is reduced relative to sending full frames of image data. Further, sending pose data from the HMD to the electronic device improves the recency of differential frames output by the electronic device. In addition to providing data to update a reference frame through an image reprojection warp (for example, image reprojection warp 730 in FIG. 7B), the pose data (for example, pose data 767) can, in certain embodiments, be provided to a rendering engine (for example, rendering engine 710) to perform the pose adjustments (for example, a three-dimensional rotation or translation of the image) at the rendering stage. In this way, new frames require less adjustment at the HMD for changes in pose occurring in the interval (for example, interval 665 in FIG. 6) between pixels being rendered at an electronic device and being available for pose adjustment at the HMD.

An example of a new frame 901 is shown on the far-left side of FIG. 9. In this illustrative example, new frame 901 comprises a new frame of digital content for an XR display prior to any correction for head pose performed by the rendering engine (for example, rendering engine 710 in FIG. 7A) based on recent head pose data (for example, head pose data 767 in FIG. 7A) from the HMD.

The frame 903 shows the new frame as output from a rendering engine or graphics pipeline that did not perform any adjustment of the rendered image to conform the perspective of the rendered image to the most recent available pose data.

Moving rightwards within the explanatory visualization of FIG. 9, box 905 shows the superposition of uncorrected frame 903 relative to a frame 907 following a pose adjustment (for example, adjusted new frame 771 in FIG. 7A) performed at the HMD. As shown in FIG. 9, a visible shift between frames 903 and 907 is present. In this example, 71% of the pixels of the originally rendered frame 903 map to pixels of HMD pose-adjusted frame 907.

An example of a frame 909 in which new frame 901 has been adjusted at the electronic device to account for the most recent pose data provided by the UN/ID to the electronic device is shown at the bottom center of FIG. 9. Moving rightwards within FIG. 9, the box 911 shows the superposition of uncorrected frame 903 relative to the HMD pose-adjusted frame 907. As shown in FIG. 9, the two frames are in closer spatial alignment than the example shown in the box 905. In this example, 85% of the pixels of pose-adjusted frame 909 map to pixels of HMD pose-adjusted frame 907. In certain embodiments, the above-described improvement in correspondence between the frame provided by the electronic device and the frame as corrected at the HMD, translates into a reduction in the computational work required of the HMD, and an overall improvement in the performance of the electronic device-TIMID pair as a system for providing an XR display.

FIG. 10A illustrates an example of operations of a method 1000 for reducing a communication load through lossless data reduction according to certain embodiments of this disclosure. In this non-limiting example, the operations of method 1000 are performed at a single computing platform (for example, electronic device 100 in FIG. 1) communicatively connected to an HMD (for example, HMD 751 in FIGS. 7A and 7B). While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, an HMD.

At operation 1005, the electronic device obtains a first reference frame (for example, reference frame 725 in FIG. 7A) comprising a first set of pixels associated with a first time.

According to certain embodiments, at operation 1010, the electronic device, or a component thereof (for example, rendering engine 710 in FIG. 7A), renders a source image as a new frame (for example, the new frame generated at operation 840 in FIG. 8 or new frame 715 in FIG. 7A), wherein the new frame comprises a second set of pixels associated with a display to be provided by the HMD at a second time subsequent to the first time. In some embodiments, the pixels of the new frame are reprojected to account for one or more intervening changes in pose between rendering and display at the HMD.

At operation 1015, the electronic device generates a differential frame (for example, differential frame 735 in FIG. 7A or the differential frame generated at operation 845 in FIG. 8) based on a difference operation between the reference frame and the new frame to identify pixels of the new frame which are unique to the new frame.

According to various embodiments, at operation 1020, the differential frame is sent from the electronic device to the HMD over a link (for example, link 315 in FIG. 3) connecting the two devices.

Further, at operation 1025, the new frame is stored in the memory of the electronic device as a second reference frame.

Figure 10B:
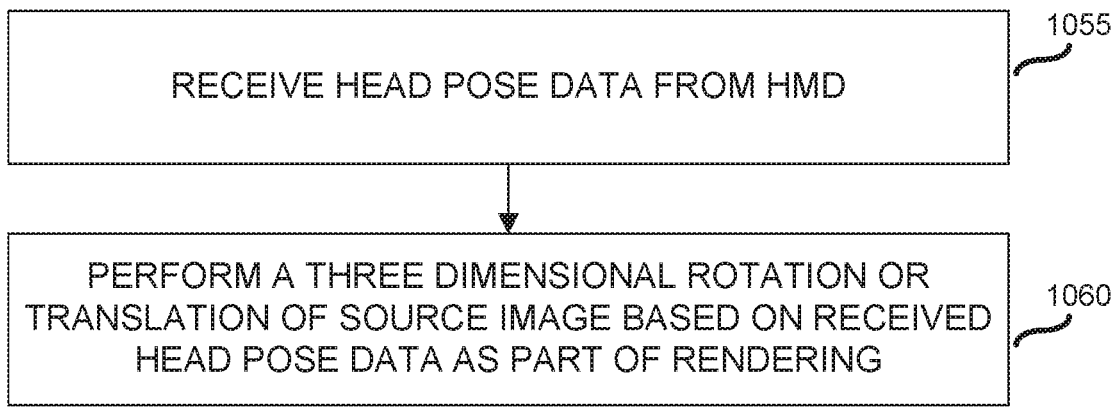

FIG. 10B illustrates further operations of methods for reducing a communication load through lossless data reduction according to certain embodiments of this disclosure. The operations described with reference to FIG. 10B are, in certain embodiments, incorporated into the method 1000 described in FIG. 10A. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, an MID.

Referring to the non-limiting example of FIG. 10B, in some embodiments, an electronic device performs, as part of the rendering process, a three-dimensional rotation or translation of a source image to "pre-adjust" the rendered image to recent head pose data. As shown through the example of FIG. 9, such adjustments during the rendering stage can reduce the computational load at an HMD.

According to certain embodiments, at operation 1055, the electronic device receives head pose data (for example, head pose data 767 in FIGS. 7A and 7B) from the HMD. In some embodiments, the received head pose data comprises the output of one or more pose tracking sensors of the MID, or a prediction as to the HMD's pose at a future point in time.

At operation 1060, the electronic device performs a three-dimensional rotation or translation of the source data based on the head pose data received at operation 1055 as part of a rendering process (for example, a process performed by rendering engine 710 in FIGS. 7A and 7B) performed at the electronic device.

As discussed elsewhere in this disclosure, in certain embodiments, the electronic device updates a reference frame prior to generating a differential frame to improve the recency of the reference frame, and by implication, to reduce the amount of correction for intervening pose changes which needs to be carried out the HMD.

Figure 10C:
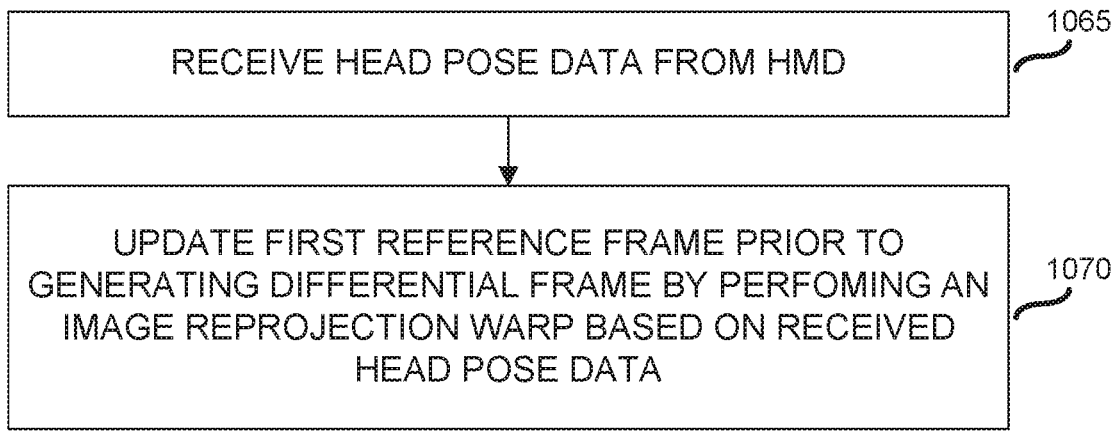

FIG. 10C illustrates another example of further operations of methods for reducing a communication load through lossless data reduction according to certain embodiments of this disclosure. The further operations described with reference to FIGS. 10B-10D can, in embodiments according to this disclosure be variously combined, either singly, or in combination, with methods for reducing communication load (for example, method 1000 in FIG. 10A).

Referring to the non-limiting example of FIG. 10C, at operation 1065, the electronic device receives, via the link connecting it to the HMD, head pose data (for example, head pose data generated at block 805 in FIG. 8) from the MID. According to various embodiments, at operation 1070, the electronic device updates the first reference frame prior to generating the differential frame by performing an image reprojection warp (for example, image reprojection warp 730 in FIG. 7B) on the reference frame.

Figure 10D:
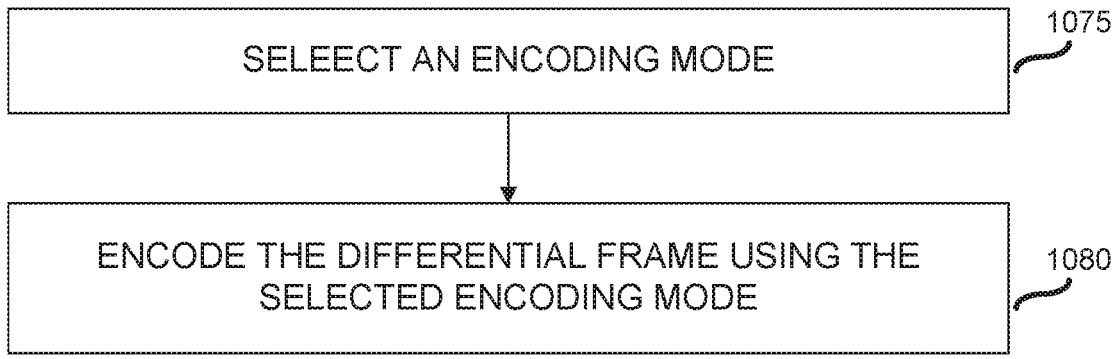

FIG. 10D illustrates another example of further operations of methods for reducing a communication load through lossless data reduction according to certain embodiments of this disclosure. Again, the further operations described with reference to FIGS. 10B-10D can, in embodiments according to this disclosure be variously combined, either singly, or in combination, with methods for reducing communication load (for example, method 1000 in FIG. 10A).

In certain embodiments according to this disclosure, the electronic device selectively encodes differential frames based on factors such as the size of the differential frame to conserve resources and improve the efficiency of the system overall. For example, in cases where a differential frame contains little data, it may be more efficient to send the differential frame to the HMD, rather than encode and decode the data. Accordingly, in some embodiments, at operation 1075, the electronic device selects an encoding mode from a plurality of encoding modes for transmitting the differential frame, wherein the plurality of encoding modes can include not encoding the differential frame. Further, at operation 1080, the electronic device encodes the differential frame according to the selected encoding mode.

Figure 11A:
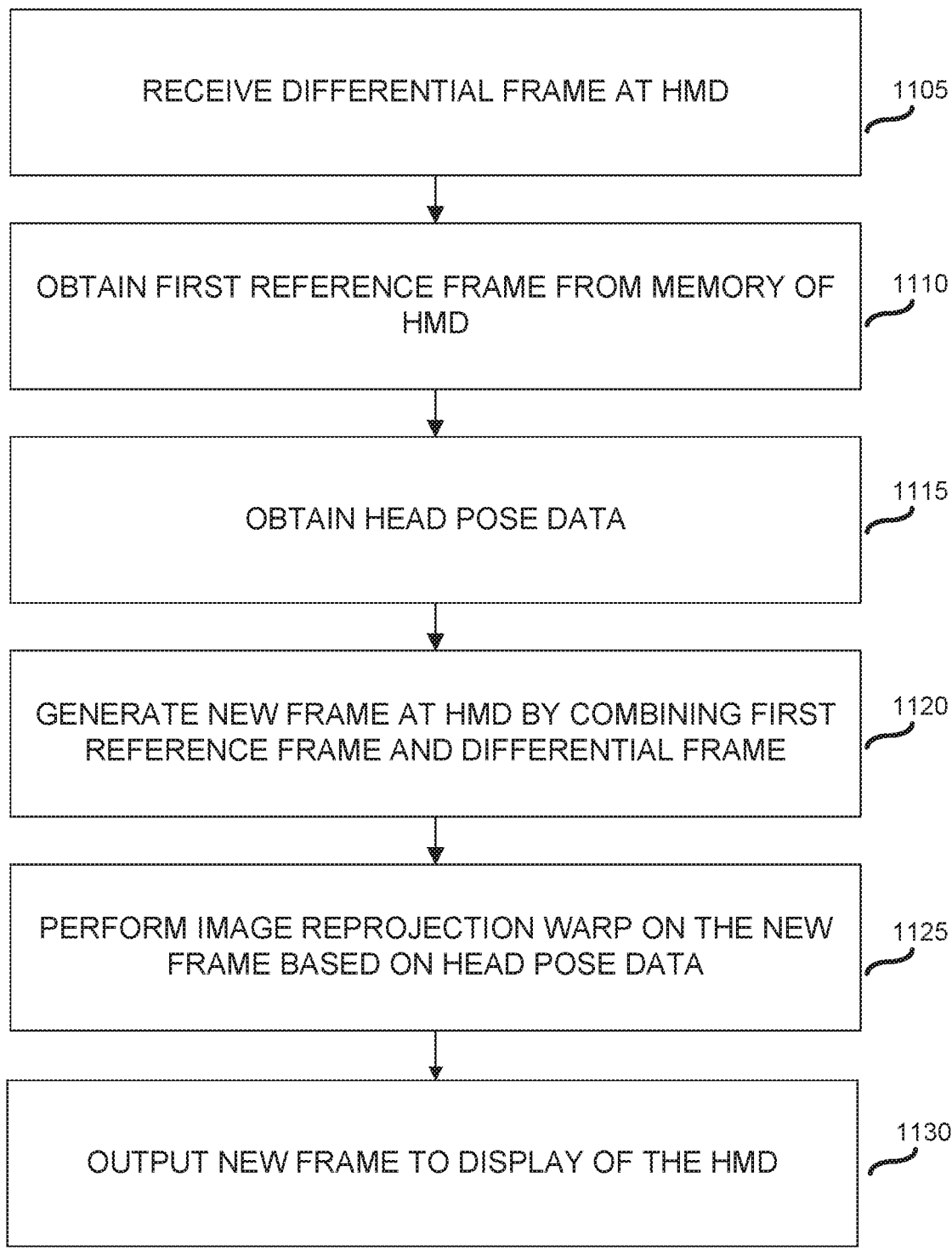
FIGS. 11A through 11C illustrate operations performed at an HMD according to certain embodiments of this disclosure.

FIG. 11A illustrates an example of a process 1100 for reducing a communication load through lossless data reduction according to certain embodiments of this disclosure. In this illustrative example, the operations of process 1100 are performed at an HMD (for example, HMD 405 in FIG. 4) communicatively connected to an electronic device. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processor in, for example, an HMD.

Referring to the non-limiting example of FIG. 11A, at operation 1105 (for example, operation 860 in FIG. 8), the HMD receives a differential frame from an electronic device, wherein the differential frame comprises pixels unique to a new frame to be displayed at the HMD.

In certain embodiments, at operation 1110, the HMD obtains a first reference frame (for example, reference frame 761 in FIG. 7A) from a memory (for example, memory 213) of the HMD. In certain embodiments, the first reference frame comprises a pose-adjusted frame previously received from the electronic device.

As shown in the non-limiting example of FIG. 11A, at operation 1115, the HMD obtains head pose data (for example, pose data ($p_x$) in FIG. 8) from one or more sensors (for example, IMU 215 in FIG. 2) of the MID.

In certain embodiments, at operation 1120, the HMD generates (for example, as shown in block 763 of FIG. 7A), or reconstitutes a new frame by combining the differential frame and the reference frame, by applying the relationship described by Equation 2 herein.

Referring to the explanatory example of FIG. 11A, at operation 1125, the HMD performs an image reprojection warp (for example, the image reprojection warp at block 769 in FIG. 7A or block 815 in FIG. 8) based on the head pose data obtained at operation 1115, thereby adjusting the new image according to the current head pose data.

In some embodiments according to this disclosure, at operation 1130, the HMD outputs the pose-adjusted new frame to a display (for example, display 207 in FIG. 2) of the MID.

Figure 11B:
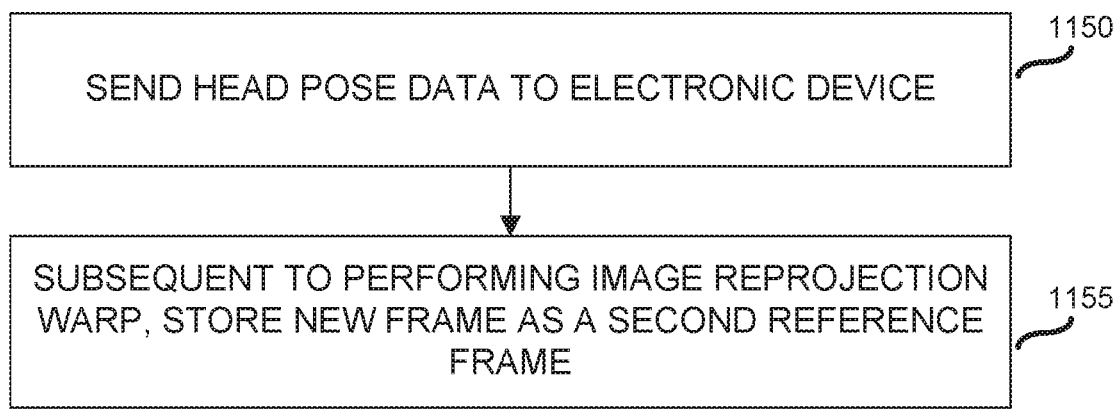

FIG. 11B illustrates examples of further operations of methods (for example, process 1100 in FIG. 11A) for reducing a communication load through lossless data reduction according to certain embodiments of this disclosure. The further operations described in the examples of FIGS. 11B and 11C can, according to various embodiments, be variously combined, both singly and in combination with methods for reducing a communication load according to certain embodiments of this disclosure. In the illustrative examples of FIGS. 11B&C, the described operations are performed at a HMD (for example, HMD 851 in FIG. 8).

Referring to the non-limiting example of FIG. 11B, at operation 1150, the HMD sends head pose data (for example, head pose data 767 in FIG. 7B) to the electronic device via the link.

According to certain embodiments, at operation 1155, subsequent to performing an image reprojection warp of the new frame to adjust the frame for data associated with the current pose of the HMD (for example, the image reprojection warp performed at block 815 in FIG. 8), the HMD stores the pose-adjusted new frame (for example, new frame 771 in FIG. 7A) as a reference frame.

Figure 11C:
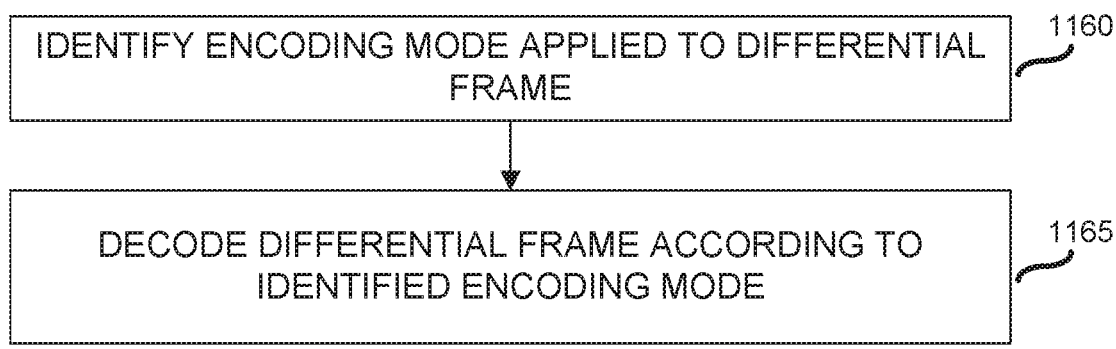

FIG. 11C illustrates an example of further operations performed at an HMD according to various embodiments of this disclosure. At operation 1160, the HMD identifies an encoding mode applied to a differential frame received from the electronic device, and at operation 1165, decodes the encoded differential frame according to the identified encoding mode.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method of reducing a transmission load between components providing an extended reality (XR) display, the method comprising:
   obtaining, from at least one memory of an electronic device communicatively connected over a wireless link to a head mounted display (HMD), a first reference frame, wherein the first reference frame comprises a first set of rendered pixels associated with an XR display to be provided by the HMD, wherein the wireless link comprises a wireless data path between a transmitter of the electronic device and a receiver of the HMD, and wherein the first set of rendered pixels is associated with a first time;
   receiving, from the HMD via the wireless link, head pose data;
   receiving, from the HMD via the wireless link, gaze tracking data showing a direction of a user's gaze;
   generating, by the electronic device based on the head pose data, a predicted head pose of the HMD at a second time subsequent to the first time;
   rendering, at the electronic device, a source image as a new frame, wherein the new frame comprises a second set of rendered pixels associated with the XR display to be provided by the HMD at the second time, wherein the new frame is rendered based on the predicted head pose of the HMD at the second time and at decreasing resolution at points away from the user's gaze based on the gaze tracking data;
   generating, by the electronic device, a differential frame, wherein the differential frame is based on a difference operation between (i) the rendered pixels of the new frame and (ii) the rendered pixels of the first reference frame, wherein the differential frame includes pixels unique to the new frame and does not include pixels subtracted from the new frame during the difference operation, and wherein the subtracted pixels are not unique to the new frame;
   selecting one of a plurality of encoding modes based on a size of the differential frame;
   encoding the differential frame using the selected encoding mode, wherein encoding the differential frame comprises applying a video compression algorithm to the differential frame;
   sending the encoded differential frame to the HMD via the wireless link; and
   storing the new frame in the at least one memory of the electronic device as a second reference frame.

2. The method of claim 1, wherein rendering the new frame based on the predicted head pose of the HMD at the second time comprises at least one of: performing a three-dimensional rotation of the source image based on the head pose data or performing a three-dimensional translation of the source image based on the head pose data.

3. The method of claim 1, wherein the electronic device updates the first reference frame prior to generating the differential frame by performing an image reprojection warp based on head pose data associated with a third time subsequent to the first time.

4. The method of claim 1, wherein the video compression algorithm is x265 compression.

5. The method of claim 1, wherein the XR display comprises image data obtained from at least one of: a digital video camera of the HMD or a dynamic vision sensor (DVS) of the HMD.

6. A method of reducing a transmission load between components providing an extended reality (XR) display, the method comprising:
obtaining, from at least one memory of a head mounted display (HMD), a first reference frame, wherein the first reference frame comprises a first set of rendered pixels associated with an XR display to be provided by the HMD, and wherein the first set of rendered pixels is associated with a first time;
sending, to an electronic device communicatively connected to the HMD over a wireless link, head pose data;
sending, to the electronic device communicatively connected to the HMD over the wireless link, gaze tracking data showing a direction of a user's gaze;
receiving, at the HMD from the electronic device over the wireless link, a differential frame, wherein the differential frame includes pixels unique to a new frame and does not include pixels subtracted from the new frame during a difference operation performed by the electronic device, wherein the subtracted pixels are not unique to the new frame, and wherein the wireless link comprises a wireless data path between a transmitter of the electronic device and a receiver of the HMD;
obtaining, from at least one motion sensor of the HMD, second head pose data;
identifying an encoding mode applied to the differential frame received from the electronic device, wherein the encoding mode comprises a video compression algorithm applied to the differential frame, and wherein the encoding mode is based on a size of the differential frame;
decoding the differential frame according to the identified encoding mode;
generating the new frame at the HMD by combining the first reference frame with the differential frame, wherein the new frame comprises a second set of rendered pixels associated with the XR display to be provided by the HMD at a second time subsequent to the first time, wherein the second set of rendered pixels is rendered by the electronic device based on a predicted pose of the HMD at the second time and at decreasing resolution at points away from the user's gaze based on the gaze tracking data;
performing an image reprojection warp on the new frame based on the second head pose data; and
subsequent to performing the image reprojection warp, outputting the new frame to a display of the HMD.

7. The method of claim 6, further comprising:
subsequent to performing the image reprojection warp, storing the new frame as a second reference frame.

8. The method of claim 6, wherein the second head pose data comprises a predicted head pose generated at the HMD.

9. The method of claim 6, wherein the video compression algorithm is x265 compression.

10. The method of claim 6, wherein the XR display comprises image data obtained from at least one of: a digital video camera of the HMD or a dynamic vision sensor (DVS) of the HMD.

11. An electronic device comprising:
at least one processor; and
at least one memory containing instructions that, when executed by the at least one processor, cause the electronic device to:
obtain, from the at least one memory of the electronic device, a first reference frame, wherein the first reference frame comprises a first set of rendered pixels associated with an extended reality (XR) display to be provided by a head mounted display (HMD) communicatively connected to the electronic device via a wireless link, wherein the wireless link comprises a wireless data path between a transmitter of the electronic device and a receiver of the HMD, and wherein the first set of rendered pixels is associated with a first time,
receive, from the HMD via the wireless link, head pose data,
receive, from the HMD via the wireless link, gaze tracking data showing a direction of a user's gaze,
generate, based on the head pose data, a predicted head pose of the HMD at a second time subsequent to the first time,
render, at the electronic device, a source image as a new frame, wherein the new frame comprises a second set of rendered pixels associated with the XR display to be provided by the HMD at the second time, wherein the new frame is rendered based on the predicted head pose of the HMD at the second time and at decreasing resolution at points away from the user's gaze based on the gaze tracking data,
generate a differential frame, wherein the differential frame is based on a difference operation between (i) the rendered pixels of the new frame and (ii) the rendered pixels of the first reference frame, wherein the differential frame includes pixels unique to the new frame and does not include pixels subtracted from the new frame during the difference operation, and wherein the subtracted pixels are not unique to the new frame,
select one of a plurality of encoding modes based on a size of the differential frame,
encode the differential frame using the selected encoding mode, wherein encoding the differential frame comprises applying a video compression algorithm to the differential frame,
send the encoded differential frame to the HMD via the wireless link, and
store the new frame in the at least one memory of the electronic device as a second reference frame.

12. The electronic device of claim 11, wherein the instructions that when executed cause the electronic device to render the new frame based on the predicted head pose of the HMD at the second time comprise instructions that when executed cause the electronic device to at least one of: perform a three-dimensional rotation of the source image based on the head pose data or perform a three-dimensional translation of the source image based on the head pose data.

13. The electronic device of claim 11, wherein the at least one memory further contains instructions that, when executed by the at least one processor, cause the electronic device to update the first reference frame prior to generating the differential frame by performing an image reprojection warp based on head pose data associated with a third time subsequent to the first time.

14. The electronic device of claim 11, wherein the video compression algorithm is x265 compression.

15. A head mounted display (HMD) comprising:
at least one motion sensor;
at least one processor; and
at least one memory containing instructions that, when executed by the at least one processor, cause the HMD to:
obtain, from the at least one memory, a first reference frame, wherein the first reference frame comprises a first set of rendered pixels associated with an extended reality (XR) display to be provided by the HMD, and wherein the first set of rendered pixels is associated with a first time, send, to an electronic device communicatively connected to the HMD over a wireless link, head pose data, send, to the electronic device communicatively connected to the HMD over the wireless link, gaze tracking data showing a direction of a user's gaze, receive, from the electronic device via the wireless link, a differential frame, wherein the differential frame includes pixels unique to a new frame and does not include pixels subtracted from the new frame during a difference operation performed by the electronic device, wherein the subtracted pixels are not unique to the new frame, and wherein the wireless link comprises a wireless data path between a transmitter of the electronic device and a receiver of the HMD, obtain, from the at least one motion sensor, second head pose data, identify an encoding mode applied to the differential frame received from the electronic device, wherein the encoding mode comprises a video compression algorithm applied to the differential frame, and wherein the encoding mode is based on a size of the differential frame, decode the differential frame according to the identified encoding mode, generate the new frame at the HMD by combining the first reference frame with the differential frame, wherein the new frame comprises a second set of rendered pixels associated with the XR display to be provided by the HMD at a second time subsequent to the first time, wherein the second set of rendered pixels is rendered by the electronic device based on a predicted pose of the HMD at the second time and at decreasing resolution at points away from the user's gaze based on the gaze tracking data, perform an image reprojection warp on the new frame based on the second head pose data, and subsequent to performing the image reprojection warp, output the new frame to a display of the HMD.

16. The HMD of claim 15, wherein the at least one memory further contains instructions that, when executed by the at least one processor, cause the HMD, subsequent to performing the image reprojection warp, to store the new frame as a second reference frame.

17. The HMD of claim 15, wherein the second head pose data comprises a predicted head pose generated at the HMD.

18. The HMD of claim 15, wherein the video compression algorithm is x265 compression.

19. The electronic device of claim 11, wherein the XR display comprises image data obtained from at least one of: a digital video camera of the HMD or a dynamic vision sensor (DVS) of the HMD.

20. A non-transitory computer-readable medium containing instructions that, when executed by at least one processor, cause an electronic device that is communicatively connected to a head mounted display (HMD) via a wireless link to:

obtain, from at least one memory of the electronic device, a first reference frame, wherein the first reference frame comprises a first set of rendered pixels associated with an extended reality (XR) display to be provided by the HMD, wherein the wireless link comprises a wireless data path between a transmitter of the electronic device and a receiver of the HMD, and wherein the first set of rendered pixels is associated with a first time, receive, from the HMD via the wireless link, head pose data, receive, from the HMD via the wireless link, gaze tracking data showing a direction of a user's gaze, generate, based on the head pose data, a predicted head pose of the HMD at a second time subsequent to the first time, render, at the electronic device, a source image as a new frame, wherein the new frame comprises a second set of rendered pixels associated with the XR display to be provided by the HMD at the second time, wherein the new frame is rendered based on the predicted head pose of the HMD at the second time and at decreasing resolution at points away from the user's gaze based on the gaze tracking data, generate a differential frame, wherein the differential frame is based on a difference operation between (i) the rendered pixels of the new frame and (ii) the rendered pixels of the first reference frame, wherein the differential frame includes pixels unique to the new frame and does not include pixels subtracted from the new frame during the difference operation, and wherein the subtracted pixels are not unique to the new frame, select one of a plurality of encoding modes based on a size of the differential frame, encode the differential frame using the selected encoding mode, wherein encoding the differential frame comprises applying a video compression algorithm to the differential frame, send the encoded differential frame to the HMD via the wireless link, and store the new frame in the at least one memory of the electronic device as a second reference frame.

21. The non-transitory computer-readable medium of claim 20, wherein the instructions that when executed cause the electronic device to render the new frame based on the predicted head pose of the HMD at the second time comprise instructions that when executed cause the electronic device to at least one of: perform a three-dimensional rotation of the source image based on the head pose data or perform a three-dimensional translation of the source image based on the head pose data.

22. The non-transitory computer-readable medium of claim 20, further containing instructions that, when executed by the at least one processor, cause the electronic device to update the first reference frame prior to generating the differential frame by performing an image reprojection warp based on head pose data associated with a third time subsequent to the first time.

23. The non-transitory computer-readable medium of claim 20, wherein the video compression algorithm is x265 compression.

24. A non-transitory computer-readable medium containing instructions that, when executed by at least one processor, cause a head mounted display (HMD) to:

obtain, from at least one memory, a first reference frame, wherein the first reference frame comprises a first set of rendered pixels associated with an extended reality (XR) display to be provided at the HMD, and wherein the first set of rendered pixels is associated with a first time, send, to an electronic device communicatively connected to the HMD over a wireless link, head pose data, send, to the electronic device communicatively connected to the HMD over the wireless link, gaze tracking data showing a direction of a user's gaze, receive, from the electronic device via the wireless link, a differential frame, wherein the differential frame includes pixels unique to a new frame and does not include pixels subtracted from the new frame during a difference operation performed by the electronic device, wherein the subtracted pixels are not unique to the new frame, and wherein the wireless link comprises a wireless data path between a transmitter of the electronic device and a receiver of the HMD, obtain, from at least one motion sensor of the HMD, second head pose data, identify an encoding mode applied to the differential frame received from the electronic device, wherein the encoding mode comprises a video compression algorithm applied to the differential frame, and wherein the encoding mode is based on a size of the differential frame, decode the differential frame according to the identified encoding mode, generate the new frame at the HMD by combining the first reference frame with the differential frame, wherein the new frame comprises a second set of rendered pixels associated with the XR display to be provided by the HMD at a second time subsequent to the first time, wherein the second set of rendered pixels is rendered by the electronic device based on a predicted pose of the HMD at the second time and at decreasing resolution at points away from the user's gaze based on the gaze tracking data, perform an image reprojection warp on the new frame based on the second head pose data, and subsequent to performing the image reprojection warp, output the new frame to a display of the HMD.

25. The non-transitory computer-readable medium of claim 24, further containing instructions that, when executed by the at least one processor, cause the HMD, subsequent to performing the image reprojection warp, to store the new frame as a second reference frame.

26. The non-transitory computer-readable medium of claim 24, wherein the second head pose data comprises a predicted head pose generated at the HMD.

27. The non-transitory computer-readable medium of claim 24, wherein the video compression algorithm is x265 compression.

* * * * *